US008170886B2

(12) United States Patent
Luff

(10) Patent No.: US 8,170,886 B2
(45) Date of Patent: May 1, 2012

(54) SYSTEMS, METHODS, AND APPARATUS TO GENERATE AN ENERGY CONSUMPTION INDEX

(75) Inventor: Robert A. Luff, Wittman, MD (US)

(73) Assignee: The Nielsen Company (U.S.), LLC, Schaumburg, IL (US)

(*) Notice: Subject to any disclaimer, the term of this patent is extended or adjusted under 35 U.S.C. 154(b) by 423 days.

(21) Appl. No.: 12/414,289

(22) Filed: Mar. 30, 2009

(65) Prior Publication Data

US 2010/0082499 A1  Apr. 1, 2010

Related U.S. Application Data

(60) Provisional application No. 61/040,466, filed on Mar. 28, 2008.

(51) Int. Cl.
*G06Q 10/00* (2012.01)
(52) U.S. Cl. ............... 705/1.1; 705/63; 33/361; 73/324
(58) Field of Classification Search ............... 705/1.1, 705/63; 33/361; 73/324
See application file for complete search history.

(56) References Cited

U.S. PATENT DOCUMENTS

| | | | |
|---|---|---|---|
| 4,525,055 A | 6/1985 | Yokoo |
| 4,930,011 A | 5/1990 | Kiewit |
| 5,321,627 A | 6/1994 | Reher |
| 5,434,508 A | 7/1995 | Ishida |
| 5,809,449 A | 9/1998 | Harper |
| 5,838,140 A | 11/1998 | Rosenthal |
| 5,930,773 A | 7/1999 | Crooks et al. |
| 6,078,871 A | 6/2000 | Anderson |
| 6,088,688 A | 7/2000 | Crooks et al. |
| 6,226,600 B1 | 5/2001 | Rodenberg, III et al. |
| 6,353,929 B1 | 3/2002 | Houston |
| 6,449,726 B1 | 9/2002 | Smith |
| 6,577,962 B1 | 6/2003 | Afshari |
| 6,636,030 B1 | 10/2003 | Rose et al. |
| 6,653,816 B2 | 11/2003 | Peek et al. |
| 6,792,297 B2 | 9/2004 | Cannon et al. |
| 6,794,849 B2 | 9/2004 | Mori et al. |
| 6,810,338 B2 | 10/2004 | Mercke et al. |
| 6,928,567 B2 | 8/2005 | Nakai |
| 6,943,693 B2 | 9/2005 | Kim |
| 6,970,131 B2 | 11/2005 | Percy et al. |

(Continued)

OTHER PUBLICATIONS

Tim Stevens, "Powering Google's PowerMeter: testing TED 5000 and AlertMe Energy," posted Dec. 8, 2009, 16 pages.

(Continued)

*Primary Examiner* — Heidi Riviere
(74) *Attorney, Agent, or Firm* — Hanley, Flight & Zimmerman, LLC

(57) ABSTRACT

Systems, methods, and apparatus to generate an energy consumption index are disclosed. In one described example, a method to generate an energy consumption index is disclosed, the method including measuring resources consumed at a home associated with a first person and calculating a home energy value indicative of the resources consumed at the home and measuring resources consumed by the person while located outside the home and calculating an out of home energy value indicative of the resources consumed by the person while located outside the home. The example method further includes identifying goods purchased by the person and calculating a purchase energy value indicative of the resources associated with the purchased goods, and generating an energy consumption index associated with the person based on the home energy value, the out of home energy value, and the purchase energy value.

19 Claims, 16 Drawing Sheets

U.S. PATENT DOCUMENTS

| | | | |
|---|---|---|---|
| 7,019,659 B2 | 3/2006 | Kobayashi et al. | |
| 7,109,876 B2 | 9/2006 | Smith et al. | |
| 7,171,331 B2 | 1/2007 | Vock et al. | |
| 7,174,260 B2 | 2/2007 | Tuff et al. | |
| 7,197,397 B2 | 3/2007 | Matsuda et al. | |
| 7,216,021 B2 | 5/2007 | Matsubara et al. | |
| 7,222,031 B2 | 5/2007 | Heatley | |
| 7,243,044 B2 | 7/2007 | McCalla | |
| 7,580,808 B2 * | 8/2009 | Bos | 702/127 |
| 2002/0194511 A1 | 12/2002 | Swoboda | |
| 2003/0004662 A1 | 1/2003 | Mitchell et al. | |
| 2003/0233201 A1 | 12/2003 | Horst et al. | |
| 2004/0117137 A1 | 6/2004 | Jin et al. | |
| 2005/0027466 A1 | 2/2005 | Steinmetz et al. | |
| 2006/0248366 A1 | 11/2006 | Schumacher et al. | |
| 2007/0066311 A1 | 3/2007 | Reibel et al. | |
| 2007/0118309 A1 | 5/2007 | Stewart | |
| 2007/0219732 A1 | 9/2007 | Creus et al. | |
| 2008/0306985 A1 * | 12/2008 | Murray et al. | 707/102 |
| 2009/0195349 A1 | 8/2009 | Frader-Thompson et al. | |

OTHER PUBLICATIONS

Written Opinion of the International Searching Authority, issued in connection with International Patent Application No. PCT/US09/41828, mailed Jun. 15, 2009, completed Jun. 5, 2009, 4 pages.

International Search Report issued in connection with International Patent Application No. PCT/US09/41828, mailed Jun. 15, 2009, 2 pages.

"Valpo Students Launch New iPhone Application," InsideINdianaBusiness.com Report, http://insideindianabusiness.com/newsitem.asp?ID=36553, Jul. 9, 2009, 2 pages.

"Optimizing Mobile Software with Built-in Power Profiling," Version 1.0, May 19, 2009, Nokia, originally published as a chapter in the book "Mobile Phone Programming and its Application to Wireless Networking," in Jun. 2007, 18 pages.

Flinn et al., "Managing Battery Lifetime with Energy-Aware Adaptation," ACM Transactions on Computer Systems, vol. 22, No. 2, May 2004, pp. 137-179, 43 pages.

Quick Start Guide, Forum Nokia—Nokia Energy Profiler, retrieved Apr. 11, 2008, 4 pages.

Gurun et al., "A Run-Time, Feedback-Based Energy Estimation Model for Embedded Devices," ACM, Oct. 22-25, 2006, 6 pages.

Business Applications Performance Corporation, MobileMark 2005, May 26, 2005, Revision 1.0, 30 pages.

Alastair Jamieson, "Smart Meters Could be 'Spy in the Home'," Telegraph Media Group Limited, retrieved from http://www.telegraph.co.uk/finance/newsbysector/energy/6292809/Smart..., published Oct. 11, 2009, 4 pages.

The Official Google Blog, "Power to the People," published Feb. 9, 2009, retrieved Sep. 23, 2009 from http://googleblog.blogspot.com/2009/02/power-to-people.html, 4 pages.

Open4Energy, "List of Home Energy Saving Devices," retrieved Sep. 23, 2009, from http://www.open4energy.com/technology/home_energy_saving_devices, 6 pages.

Google Inc., "Comments of Google Inc. Submitted in response to the Notice of Intent to Issue a Funding Opportunity Announcement for the Smart Grid Investment Grant Program," May 6, 2009, retrieved Sep. 23, 2009, 3 pages.

Google PowerMeter, "Frequently Asked Questions," retrieved Sep. 23, 2009 from http://www.google.org/powermeter/faqs.html, 2 pages.

Google PowerMeter, "What Google is Doing," retrieved Sep. 23, 2009 from http://www.google.org/powermeter/howitworks.html, 1 page.

"Big Savings on Home Electric Bills," Ecodog—giving people power over energy, retrieved Sep. 23, 2009 from www.ecodoginc.com, 2 pages.

Katie Fehrenbacher, "10 Monitoring Tools Bringing Smart Energy Home," posted Apr. 14, 2009, retrieved Sep. 23, 2009 from http://earth2tech.com/2009/04/14/10-energy-dashboards-for-your-home/, 20 pages.

United States Environmental Protection Agency, "Energy Star—The Power to Protect the Environment Through Energy Efficiency," Jul. 2003, 16 pages.

Energy Star, "What is a HERS rating," retrieved Nov. 20, 2007, last updated May 8, 2007, 2 pages.

"About Energy Star," http://www.energystar.gov/index.cfm?c=about.ab_index, retrieved Nov. 20, 2007, 1 page.

United States Environmental Protection Agency, "Energy Star Overview of 2006 achievements," figures as of Mar. 1, 2007, 4 pages.

SmartPlanet, "Solo, Duet & Trio energy monitors queue up to smash Wattson and OWL," CRAVE, CNET UK gadget blog, Sep. 16, 2008, 4 pages.

Rikke Bruntse-Dahl, "Move over Wattson, here comes Ewgeco," News at SmartPlanet.com, Mar. 18, 2008, 7 pages.

United States Patent and Trademark Office, Office Action issued in connection with U.S. Appl. No. 12/121,534, mailed Feb. 3, 2011 (12 pages).

XCEL Energy, Littleton, CO, retrieved May 14, 2009, from http://www.energyguide.com/ha/Appl.asp?referrerid=164; http://www.energyguide.com/ha/bh.asp?ReferrerID=164; http://www.energyguide.com/ha/ApplianceResults.aspx; http://www.energyguide.com/ha/HomeProfile.aspx; http://www.energyguide.com/ha/HomeResults.aspx; http://www.energyguide.com/ha/ImproveMyHome.aspx; http://www.energyguide.com/ha/billedit.aspx; http://www.energyguide.com/ha/weather1.asp?referrerid=164; http://www.energyguide.com/ha/MeasuresComb.asp?

* cited by examiner

SYSTEMS, METHODS, AND APPARATUS TO GENERATE AN ENERGY CONSUMPTION INDEX

RELATED APPLICATIONS

This patent claims the benefit of U.S. Provisional Application 61/040,466, filed Mar. 28, 2008, the entirety of which is incorporated by reference.

FIELD OF THE DISCLOSURE

This disclosure relates generally to the measurement of energy consumption and, more particularly, to systems, methods, and apparatus to generate an energy consumption index.

BACKGROUND

Energy management and conservation has become an increasing public concern. Agencies such as the United States Environmental Protection Agency have developed programs like Energy Star to assist businesses and the public in general in making environmentally-conscious decisions when it comes to electrical devices and home appliances. Tools such as "carbon footprint" calculators can assist an individual, family or business in determining the environmental impact of their consumption. Further, some governments use emissions trading as a way to encourage the reduction in polluting emissions.

DETAILED DESCRIPTION

Figure 1:
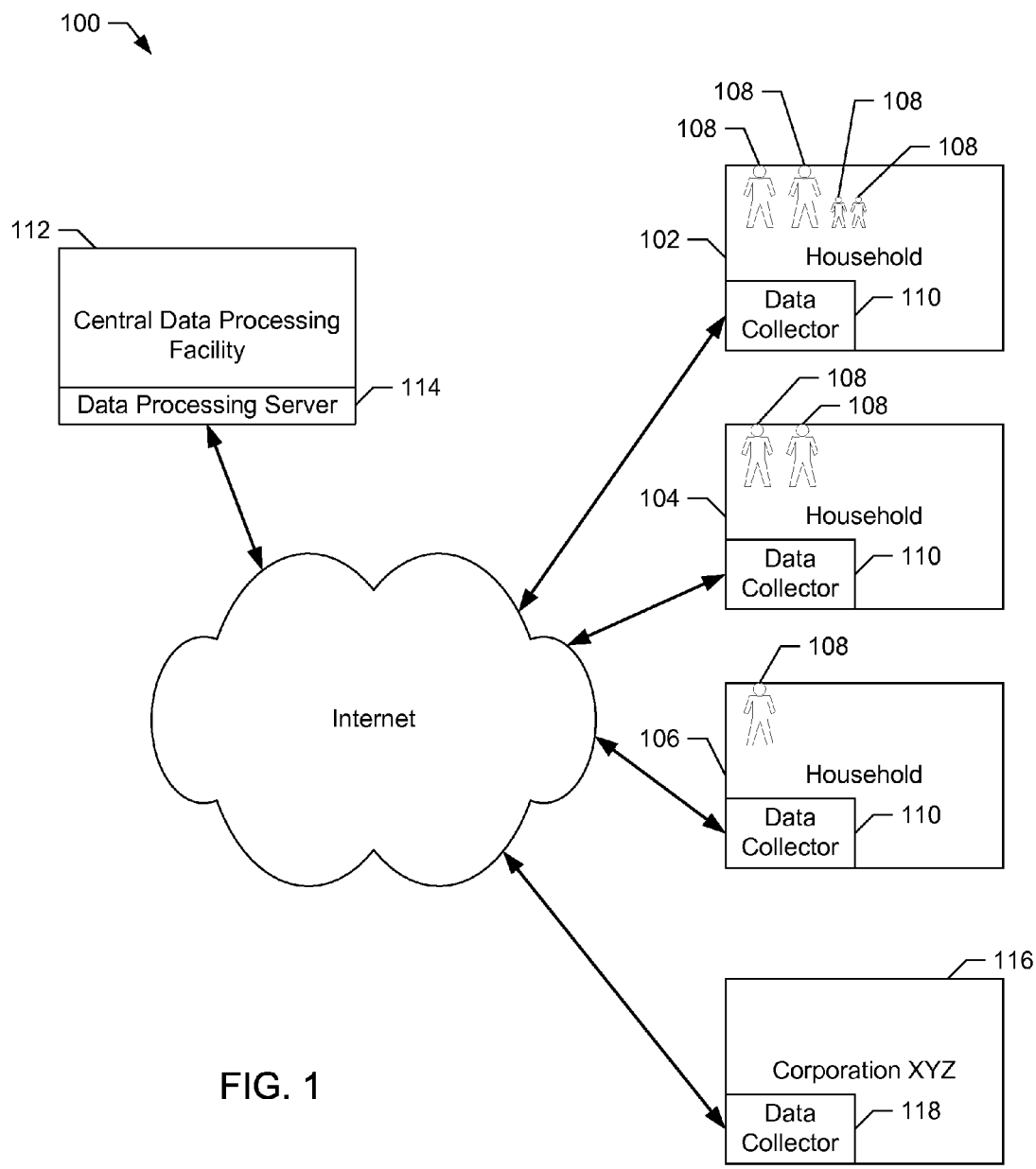
FIG. 1 is an illustration of an example system to collect resource consumption information from a panel of persons, households and/or companies.

Although the example systems and apparatus described herein include, among other components, software executed on hardware, such systems and apparatus are merely illustrative and should not be considered as limiting. For example, it is contemplated that any or all of the disclosed hardware, firmware, and/or software components could be embodied exclusively in dedicated hardware, exclusively in software, exclusively in firmware or in some combination of hardware, firmware, and/or software.

Homes and consumers typically have many opportunities to reduce personal consumption. However, there are few sources to provide feedback on how effective a person's efforts to reduce personal consumption are on reducing emissions. Additionally, no systems currently exist to relate and/or index personal conservation efforts to a larger public or government goal. While government agencies and utilities currently have access to macro-level data of energy consumption, the macro-level data lacks detail and granularity. Such data is not very useful for creating fair, effective government energy conservation programs to meet personal, local, and/or national goals.

An easily understandable public vocabulary facilitates private, public and/or government conservation efforts by standardizing energy measurements. An understandable public vocabulary may be achieved by facilitating open dialog, sharing best practices, and/or via friendly person-to-person or state-to-state comparisons or competition.

To achieve energy conservation goals, governmental agencies and the public would benefit from standard systems, methods, apparatus, and articles of manufacture to uniformly track and communicate energy consumption. The example systems, methods, apparatus, and articles of manufacture described herein enable individuals, households, businesses, governments, agencies, and/or other entities to take control of daily energy consumption by providing granular energy consumption data. Granular data illustrates the significance of daily activities and the corresponding effects on energy consumption. Based on the data, individuals, households, businesses, governments, agencies, and/or other entities can act appropriately to efficiently reduce energy consumption at reduced costs. Additionally, public policy makers may use such additional granular data with details such as the number of people in the household or demographic details to better represent and/or define local, state, national, and/or other official goals to drive public or private conservation efforts.

Some example systems, methods, apparatus, and articles of manufacture described herein enable a uniform approach to determining a personal energy index, a home energy index, a household energy index, a business energy index, and/or any other energy index. Some example systems, methods, and apparatus facilitate generation of local, national, personal, home, household, business, agency, and/or other entity energy averages. Such averages may be considered by age, gender, ethnicity, income, marital status, size of building, construction material, style of building, or by any other factor. The energy indices and/or averages can be used to understand and/or form fact-based policies and provide tools to track conservation progress at the personal, local, organizational, and/or national levels in a consistent manner.

In general, example systems, methods, apparatus, and articles of manufacture described herein may be used to measure, calculate, and/or identify resource and/or energy consumption by a person, household, agency, corporation, company, government, and/or other entity. Disclosed example systems, methods, apparatus, and/or articles of manufacture facilitate generation of an energy consumption index to reflect the resource and/or energy usage patterns of corresponding entities and/or individuals. In some examples, portions of the resource and/or energy consumption by a household or company are assigned to individual persons associated with the household or company so that the consumption total of tracked person(s) is equal to the total household and/or company consumption(s). In some examples, individual energy consumption data is sorted and/or aggregated to define consumption for a collection of individuals (e.g., a household, a company, or any other organization).

In some examples, a data collector aggregates resource consumption data from sources used by the person, household, company, and/or other entity (collectively and individually "the monitored entity") calculates the energy associated with generating, transporting, disposing of, and/or otherwise utilizing the resources, and reports the resources and/or energy consumed by the monitored entity. In some examples, the data collector reports to the monitored entity using the resources and/or reports to another party (e.g., a research agency, a government agency, etc.) responsible for collecting data from multiple monitored entities.

In some examples, a data collector collects personal consumption information for a monitored individual and generates a personal energy index based thereon. The example personal consumption information includes at least a portion of home resource consumption allocated to the monitored individual, resource consumption by the monitored individual outside the home, and purchase information allocated to the monitored individual. The data collector receives the personal consumption information, generates a personal energy index, displays the personal energy index at a location visible to the monitored person, and/or transmits the personal energy index and/or the personal consumption information to a third party such as a research agency who can draw statistical conclusions concerning a wider population based on monitored individuals (e.g., panelists).

In some example systems and apparatus described herein for monitoring home or household energy consumption, a data collector receives data from several sources, including home appliances, fixtures, devices, electrical meters, water meters, and/or natural gas meters. It also receives data reflecting vehicle usage, purchasing information, and/or other data sources. The example data received from the home appliances, fixtures, meters, and devices is used to determine how much energy is consumed by the home. The data may also be analyzed to identify consumption trends. Energy consumption habits are determined for certain activities, such as cooking or watching television.

Additionally, the example data collector uses the data received from a vehicle associated with the person(s) living in the monitored home to determine how much energy is consumed by each person for travelling activities. Consumed energy is divided among and assigned to the persons traveling in the monitored vehicle(s). In some examples, the data collector also receives data associated with purchases made by the person(s) in the monitored home, determines the energy associated with the purchases, and assigns the energy and/or purchases to one or more of the persons in the monitored household. Thus, as used herein, "home energy" refers to energy consumed within a home. "Transportation energy" refers to energy consumed by travel in a vehicle. "Out of home energy" refers to energy consumed outside the home excluding transportation energy. "Purchases energy" refers to energy associated with purchased goods and/or services. "Household energy" refers to the sum of home energy, transportation energy, out of home energy, and purchases energy for the monitored household.

In some examples, the data collector generates one or more energy indices based on the resource consumption data received. Each person associated with a monitored household, as well as the household itself, is assigned an energy index. The personal and/or household energy indices are displayed on the data collector for the persons to observe, allowing them to track energy conservation efforts over time.

In some examples, a central data collector generates an organizational energy index based on resource consumption information from resource meters, equipment energy consumption meters, and/or purchasing information from a purchasing system relating to monitored organizations such as a company, business, or agency. The central data collector receives the resource consumption information and purchasing information, generates an organizational energy index based on the received information, and displays the organizational energy index to one or more persons associated with the monitored organization. The example central data collector may also allocate resource consumption information and purchasing information to unit(s) and/or individual(s) associated with the monitored organization to generate other unit and/or individual energy indices for the unit(s) and/or person(s).

Turning now to the drawings, FIG. 1 is an illustration of an example system 100 to collect resource consumption information from a panel of persons, households, agencies, and/or companies (collectively and/or individually "entities"). As used herein, the term "household" is taken to mean one or more persons living together in a living space. The households 102, 104, 106 may be any type of residence to be monitored. A living space is also referred to as a "home," and may include, but is not limited to, single and/or multi-family houses, condominiums, townhouses apartments, and/or duplexes. A number of households, including households 102, 104, and 106, are selected as panelists. The panelists may be selected, for example, by statistical methods to represent a population of interest. Each household 102, 104, and 106 is associated with a number of persons 108 living in the respective household. These persons 108 consume resources such as food, clothing, electricity, natural gas, water, and/or other resources associated with the household. The households 102, 104 and 106 may also be respectively associated with vehicles (not shown) used for, among other things, transportation of one or more persons 108.

In the example of FIG. 1, each household 102, 104, 106 includes a data collector 110 that collects resource consumption data, based on the activities of person(s) 108 and/or the households 102, 104, and 106. As described below in detail, the data collector 110 receives resource consumption data from household appliances, purchases associated with the persons 108, vehicles, and/or other sources. The example collected data is compiled and/or interpreted, and then transmitted to a central data processing facility 112 having a data processing server 114. Alternatively, the data may be forwarded to the central data processing facility 112 without being processed.

The data processing server 114 of the illustrated example is connected to the data collectors 110 via the Internet, and receives the data from the data collectors 110 for analysis and storage. Alternatively, the data processing server 114 may be connected to the data collectors 110 via another medium, such as a direct modem connection via the public switch telephone network (PSTN). Depending on the amount of information to be analyzed, there may be several data processing servers 114 within the central data processing facility 112. Likewise, there may be several central data processing facilities 112.

The central data processing facility 112 of the illustrated example also collects data from organizations, such as the example company Corporation XYZ 116. Corporation XYZ 116 uses a data collector 118 which may be the same, substantially the same, or different than the data collectors 110 used in the monitored households 102, 104 and 106. For example, the data collector 118 may be implemented as a software module on a computer network of Corporation XYZ and/or have a larger number of inputs corresponding to the larger number of resource-consuming equipment. The data collector 118 also communicates with the central data processing facility 112.

Figure 2:
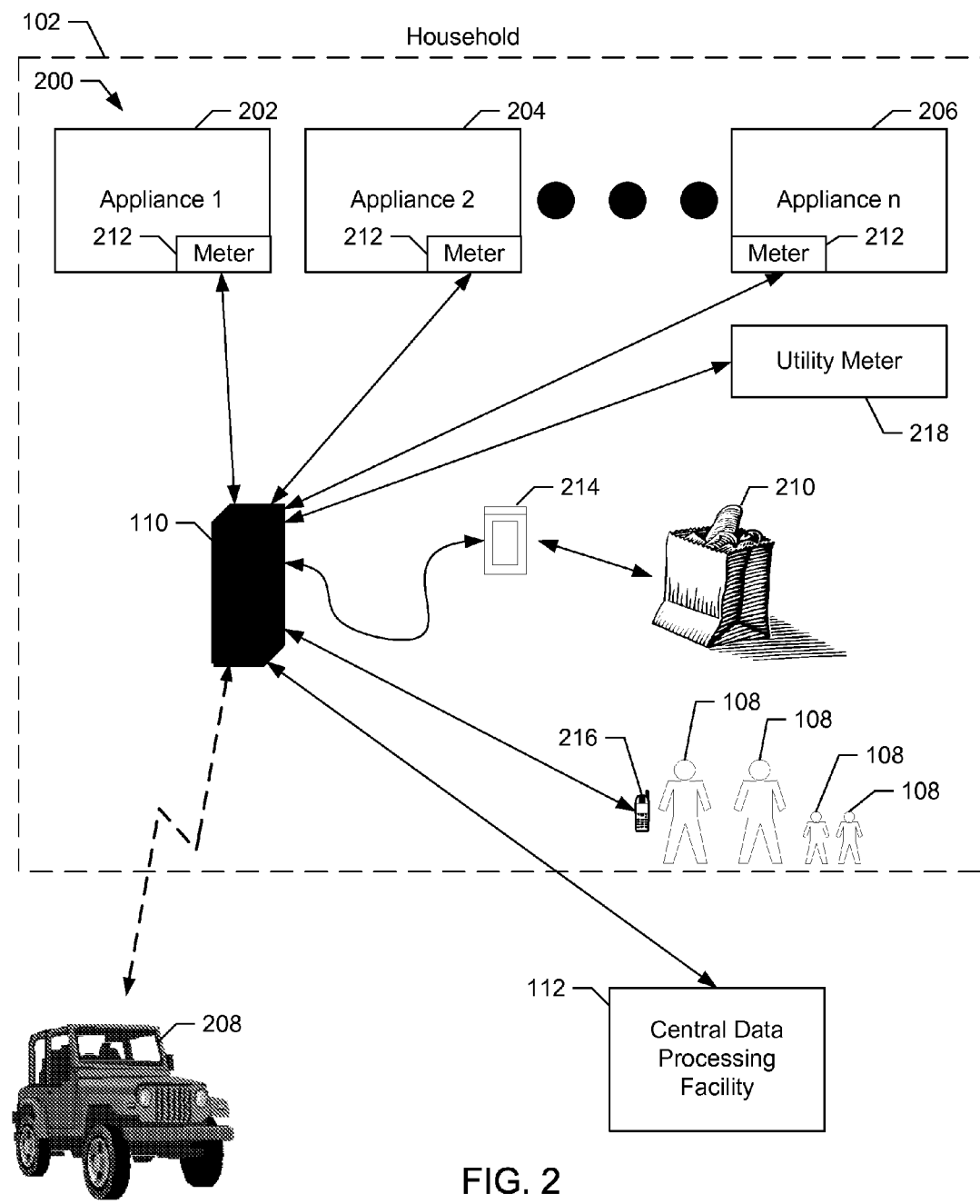
FIG. 2 is an illustration of an example system to collect resource consumption information from different of sources within a selected household.

FIG. 2 is an illustration of an example system 200 to collect resource consumption information from different sources within a monitored household. For ease of discussion, the following description will refer to the example household 102 shown in connection with FIG. 1. Several persons 108 are associated with the example household 102. There are also a number of appliances 202, 204, and 206 within the household 102 that use energy or resources. In addition to resource-consuming equipment inside the household 102, there are also one or more vehicles 208 associated with the household 102 and/or the persons 108. Lastly, the persons 108 purchase goods 210 from outside the household 102 for consumption. As described below, the energy consumption associated with any or all of these activities (e.g., the home energy, the transportation energy, the out of home energy, the purchases energy, and/or the household energy) are monitored and/or analyzed.

The example vehicle 208 is used by one or more persons 108 associated with the household 102 to travel between the household 102 and among other locations. To transport the persons 108 in the vehicle 208, the vehicle 208 must consume resources such as fuel, engine fluids, and tire rubber. The consumed resources are measured and allocated to the persons 208 being transported in the vehicle, as described in detail below.

The household 102 includes a data collector 110 for receiving data associated with resource consumption from different sources such as those mentioned above. To receive data, the data collector 110 is communicatively coupled to meters configured to measure and report resource consumption data. Such meters include, but are not limited to, appliance meters 212, barcode scanners 214, mobile (e.g., portable or handheld) devices 216, and/or utility meters 218.

In the illustrated example, appliance meters 212, discussed in greater detail below, are coupled to respective household appliances, fixtures, and/or other energy consuming devices to collect resource consumption information. For example, appliance meters 212 are coupled to, among other things, a refrigerator (e.g., an appliance 1), an electrical outlet (e.g., a fixture), and/or a television (e.g., a device). The appliance meters 212 measure resource consumption data for one or more types of resources and report the resource consumption to the data collector 110 at regular and/or irregular intervals. The data collected by the appliance meter 212 are generally categorized as home energy.

The barcode scanner 214 of the illustrated example scans universal product codes (UPCs) associated with purchased items 210 to identify the same. The collected UPC codes are sent to the data collector 110. The data collector 110 references a database (either locally or remote via, for example, the Internet) to identify the product(s) associated with the code(s). The identities of the products are then used to access a database (again, either locally or remote) correlating products to purchase energy values. (Alternatively, the UPC codes may be already correlated to the purchase energy values.) The purchase energy values reflect, for example, an amount of energy required to manufacture the corresponding product and its packaging, the amount of energy required to transport the corresponding product to the point of sale, an amount of waste associated with the use of the product (e.g., landfill space requirements, bio-degradability, etc.), and/or the recyclability of the product. The data collector 110 associates the purchase energy values with the one or more persons 108 in the household 102 who made the purchases. The persons 108 associated with the purchases may be identified by scanning an identifier bar code identifying the household member when scanning the UPC codes.

The mobile device 216 monitors resource consumption by a monitored person while located outside the household 102. The mobile device 216 of the illustrated example utilizes global positioning system (GPS) technology and/or cellular telephone signals to track the geographic locations of the individual carrying the device. The location information may be used to infer energy consumption (e.g., time spent at the movie theater is indicative of watching a movie and can be attributed to an out of home energy value). The mobile device 216 may also accept manual inputs to enable the user to identify activities throughout a day. The identification of activities may be made, for example, by selecting from a drop down menu of activities or typing in an activity name. Then, for example, activities such as working at the office, going to a museum, eating lunch, going to a doctor, visiting a hospital, smoking, going to a bar, etc. can all be assigned out of home energy values that are allocated to the person participating in the activity. The out of home energy values, like the other energy values described in home, may have values per unit of time. Thus, the mobile device 216 preferably collects both the activity identification information and the time information indicating how much time was spent participating in the activity.

A utility meter 218 is used to collect data reflecting the amount of energy entering the house. For example, a first utility meter 218 is used to meter the amount of water used by the house, a second utility meter 218 is used to measure the amount of natural (or other) gas used by the house, a third utility meter 218 is used to measure the amount of electricity used by (or in the case of a home with solar panels, produced by) a home, etc. The outputs of the utility meters 218 are typically categorized as home energy.

The level of resolution of resource consumption information may depend on the type and/or quantity of meters 212, 218 used. Appliance meters 212 that measure resource consumption by individual appliances typically provide information with more resolution or precision than utility meters 218. However, the utility meters 218 may ensure all or substantially all of the resource consumption by the household 102 is logged. For example, the utility meters 218 may not be able to determine that a particular appliance (e.g., the refrigerator) consumes a relatively large portion of energy, but it can determine how much energy the household 102 is using as well as the hours of the day when the most energy is used (e.g., peak consumption times, low consumption times, etc.). In contrast, an appliance meter 212 coupled to the refrigerator can determine how much electrical energy the refrigerator is using, but may not be able to determine how much energy the entire household 102 is using.

To determine how the household resource consumption (e.g., the home energy values, etc.) is allocated among the household members, the example household 102 also includes a device to detect the presence of the monitored persons 108 associated with the household 102. For example, each person 108 may carry a device (e.g., the mobile device 216) that allows the data collector 110 to detect the proximity of the person. Alternatively, the data collector 110 may be programmed with information indicating when each person 108 is typically at the household or away from the household. This information could indicate allocation rules such as, for example, a certain person 108 is typically away from the household 102 from 8 AM to 5 PM, Monday through Friday of each week and, thus, does not consume household resources during these times. The persons 108 may additionally or alternatively input exceptions to the allocation rules, and/or input times at the household 102 and/or away from the household 102 for the times that do not have defined allocation rules.

Although the example system of FIG. 2 collects multiple types of energy values (e.g., home energy values, transportation energy values, out of home energy values, and purchase energy values), preferably all of the energy values are similarly scaled so that they may be easily scanned to produce a household energy value.

Household Resource Consumption

Figure 3:
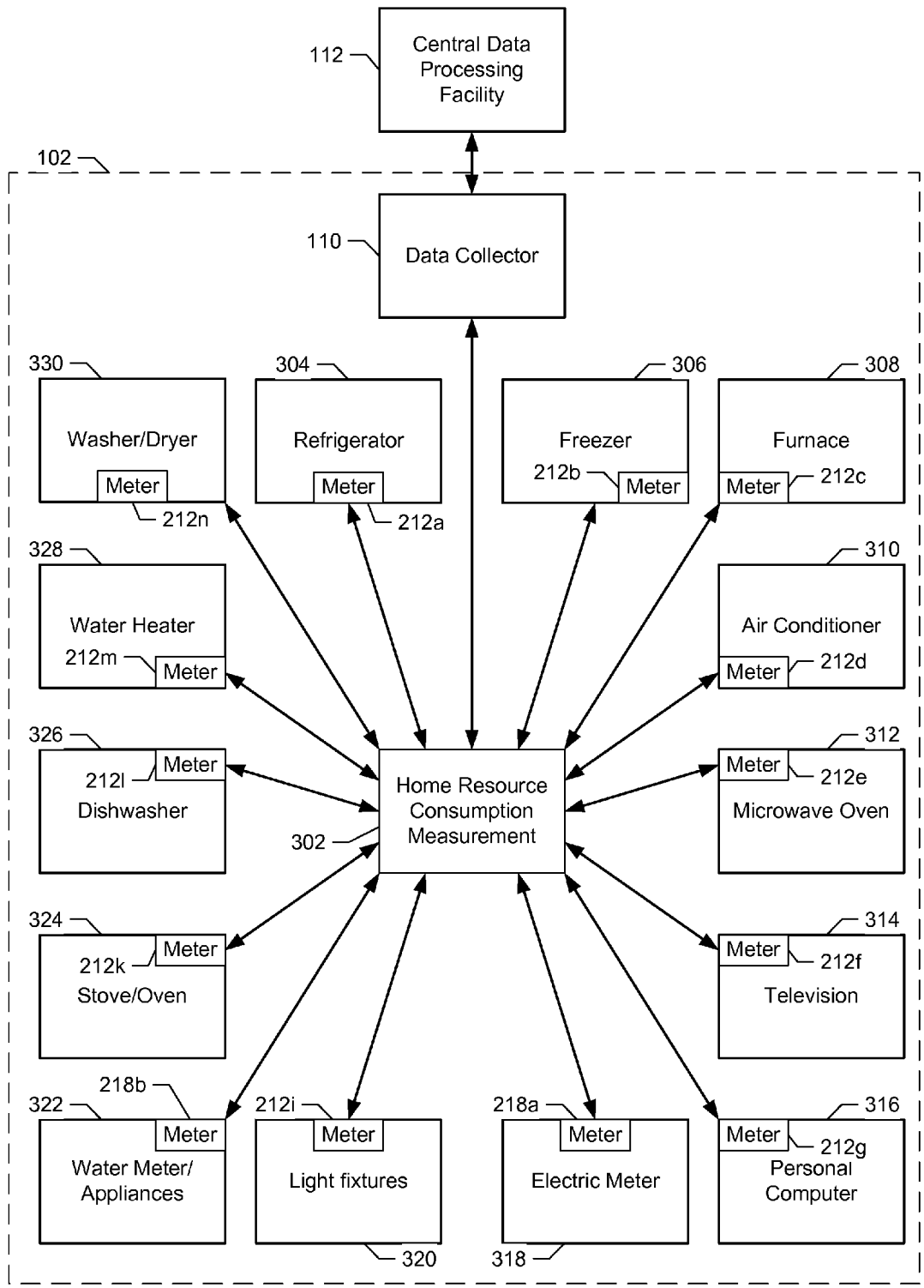
FIG. 3 is a block diagram of an example system to receive resource consumption information from appliances associated with a measured home.

FIG. 3 is a block diagram of an example system 300 to receive resource consumption data (e.g., home energy values) from appliances 304-330 associated with a measured household. For ease of discussion, the example system 300 of FIG. 3 will be considered part of the household 102 being measured. The example system 300 has a Home Resource Consumption Management (HRCM) device 302. The HRCM device 302 receives information from a number of meters associated with respective appliances, fixtures and/or other devices associated with household 102. Example devices include a refrigerator 304, a freezer 306, a furnace 308, an air conditioner 310, a microwave oven 312, a television 314, a personal computer 316, a home electric meter 318, a light fixture 320, home water meter(s) 322, a stove and/or oven 324, a dishwasher 326, a water heater 328, a clothes washer and/or a dryer 330. This list of appliances 304-330 is intended to be illustrative rather than limiting. The home water meter (s) may be implemented using, for example, a water meter for the entire household and/or water meters to measure water usage at each particular faucet and/or water-using appliance. Any of the appliances, fixtures or other devices (e.g., consumer electronics, etc.) listed or not listed may be combined or split into multiple appliances, fixtures and/or devices. Although the appliances, fixtures and/or devices 304-330 are shown in FIG. 3 as within the household 102, appliances such as the air conditioner 310 may be located outside the household 102 as is conventional.

In the illustrated example, each appliance, fixture and/or device has one or more appliance meters 212a-n coupled thereto to measure the resources used by the respective appliance, fixture, or device. For example, a clothes dryer may use natural gas to heat clothes being dried while using electricity to power a tumbling device, requiring multiple meters 212 or one meter 212n capable of measuring electricity and natural gas consumption.

Appliances may be added or subtracted from this list to adjust the resolution or granularity of data desired. For example, when measuring resources it may be desirable to use meters 212a-n to individually measure appliances, fixtures and/or devices that consume a relatively large portion of electricity or have special features, such as the air conditioner 310, microwave oven 312, and television 314. A utility meter 218a may then be used to track the home electrical meter 318 (used by a power company providing power to the household 102) to measure the amount of power used by the household as a whole. Subtracting the electricity used by the metered appliances from the total electricity used by the household reveals the amount of electricity used by the non-individually metered appliances, fixtures and devices associated with the household 102. This approach saves meters from being used to measure, for example, individual light fixtures 320 from which high-resolution data may not be necessary. The same may be done for the home water meter 322 as an alternative to measuring every faucet that uses water.

The appliance meters 212a-n and the utility meters 218a and 218b are communicatively coupled to the HRCM device 302 to report measured data to the HRCM device 302. The reporting may be performed at regular and/or irregular intervals, continuously or substantially continuously, on demand from the HRCM device 302, and/or manually. The HRCM device 302 may passively receive data from the appliance meters 212a-n and the utility meters 218a-b and/or may actively request data from any or all of the meters 212a-n and/or 218a-b. After receiving data, the HRCM device 302 may store the data or process it to obtain a particular data format. For example, the HRCM device 302 may receive an electricity usage measurement from an appliance meter 212, determine the energy in Joules and/or the associated carbon load required to produce the electricity, and store the information in a memory or a home energy value for later transmission.

The example HRCM device 302 of FIG. 3 is also communicatively coupled to the data collector 110 for the household 102 to report raw and/or processed data. For example, the HRCM device 302 of FIG. 3 is a module that is communicatively and mechanically coupled to the data collector 110. Alternatively, the HRCM device 302 may be integrated into the data collector 110 as software. The example system 300 may also have a multiplexing device or switch between the HRCM device 302 and the meters 212a-n and/or 218a-b to reduce the number of physical inputs required at the HRCM device 302. The HRCM device 302 may additionally or alternatively utilize a wireless link instead of or to complement wired connection(s) from the meter(s) to the data collector 110 and/or to transmit resource consumption measurements.

To differentiate the resource consumption measurements sent to the HRCM device 302 from the appliance and utility meters 212a-n and 218a-b, the meters 212a-n and 218a-b of the illustrated example provide an identification code with their data. The identification code may be transmitted before, during, and/or after the resource consumption measurement information is transmitted. Alternatively, each meter 212a-n and 218a-b may encode the transmitted consumption measurement information with a unique code to identify the source of the transmitted information to the HRCM device 302. Similarly, if the HRCM device 302 requests resource consumption information from an example meter 212a, the HRCM device 302 may transmit a code with the request to identify the desired meter 212a.

While the example HRCM device 302 and the meters 212a-n and 218a-b of FIG. 3 are shown as connected in a star topology, the HRCM device 302 and the meters 212a-n and 218a-b may be connected in a ring, mesh, or any other network topology.

Home resource consumption measurements may be collected and/or reported for any type of resources, including, but not limited to, electricity, natural gas, gasoline, fuel oil, kerosene, propane, wood, light, temperature, water, and/or heating oil. Measurements as collected and/or reported may have different units depending on the resource measured, and may be converted to a standard unit of measurement (e.g., joules, tons of $CO_2$, any other unit, and/or a unitless measure that is standardized) by the data collector 110, HRCM device 302, the appliance meters 212a-n, the utility meters 218a-b, and/or a central data processing facility (e.g., the central data processing facility 112 or data processing server 114 as described in FIGS. 1 and 2).

The example HRCM device 302 and/or the example data collector 110 include a user interface to enter and/or adjust resource consumption information. Some types of resource consumption, such as for burning wood, is difficult for a machine to measure. The user interface allows a person 108 to input resource consumption measurements to the HRCM device 302 and/or the data collector 110 to log such resource consumption (e.g., 3 logs burned).

The example HRCM device 302 and/or the example data collector 110 of FIG. 3 are also useful for determining energy consumption associated with different household activities, such as cooking or watching television. For example, a person 108 may be in a kitchen of the example household 102 to cook a meal. To cook the meal, the person utilizes the stove and/or oven 324, the microwave oven 312, and a television 314 located in the kitchen, each having a meter 212e, 212f, and 212k that transmits a consumption indicator to the HRCM device 302 when the meters 212e, 212f, and 212k register the beginning of resource consumption at the metered appliances.

In the example activity, the person 108 first turns on the stove/oven 324, which begins to consume a relatively large amount of electrical or gas energy. The meter 212k registers the increase in consumed power and sends a consumption indicator to the HRCM device 302 for the stove/oven 324. On receiving the indicator, the HRCM device 302 signals the meters 212e and 212f associated with the microwave oven 312 and television 314 to monitor the microwave oven 312 and the television 314, respectively, for resource consumption. The person 108 additionally turns on the television 314 and cooks part of the meal in the microwave oven 312, which cause the meters 212e and 212f to measure the corresponding consumed resources.

When the person 108 has finished cooking, the stove/oven 324, microwave oven 312 and television 314 are turned off The meters 212e, 212f and 212k then send resource consumption measurements (e.g., home energy values representative of the amount of energy used by the corresponding appliances) to the HRCM device 302, which associates the energy values with the cooking activity and transmits the data to the data collector 110. The data collector 110 may, for example, determine the resources consumed by the cooking activity for an entire time period (e.g., a month) and display it for the person 108 to analyze.

Although three appliances/devices were used in the example activity, it is contemplated that more or fewer appliances may be monitored and/or measured for any appropriate activity. For example, the washer/dryer 330 may be monitored for an activity such as doing laundry.

Additionally, for an activity such as cooking, appliances and/or devices (e.g., a food processor or a blender) may be used and then put away. Although such appliances and/or devices may not require an appliance meter 212, using, for example, information from an electrical meter for the entire household 102 may not provide the desired granularity of information for the cooking activity. In this example case, it may be desirable to provide an appliance meter 212 or a utility meter 218 for each kitchen electrical outlet to measure resource consumption for appliances and/or devices drawing energy from the kitchen electrical outlets. Although in the above example, the appliance meters are described as calculating energy values, in alternative examples the meters simply monitor on/off events and the HRCM device 302 computes the energy values. For example, the HRCM device 302 may log on and off events to determine usage times and then multiple the usage times by an average energy per unit of time factor for the corresponding metered appliances to calculate the energy value for the activity.

In some examples, indirect tools are used to measure energy consumption on individual subsystems. For example, the circuit breaker box or fuse box of the household 102 is fitted with one or more non-contact sensor(s), such as Hall Effect sensor(s). The Hall Effect sensor(s) measure the energy consumption on individual circuit(s). Data from several such sensors could be combined at the data collector 110 to recognize a "load signature" for individual appliances and/or activities. For example, a vacuum cleaner requires a substantial amount of energy for short time periods, and the vacuum cleaner is moved from room to room (i.e., subsystem to subsystem or circuit to circuit). When the data collector 110 recognizes the load signature corresponding to vacuuming on one or more subsystems, the data collector 110 determines that someone is vacuuming and logs the energy consumed by the subsystem as occurring due to vacuuming activity.

As described in FIG. 2, the data collector 110 communicates with the central data processing facility 112. The data collector 110 sends raw and/or processed energy consumption data (e.g., energy values) to the central data processing facility 112 for aggregation and/or additional processing. At periodic and/or aperiodic intervals, the central data processing facility 112 returns the processed energy consumption data to the data collector 110. In some examples, the energy consumption data includes 'standard' energy consumption data for the monitored appliances (e.g., an amount of energy that an appliance should consume, an energy consumption goal for a given type of appliance), which allows the data collector 110 to determine the energy consumption indices for the corresponding appliances 304-330 of the household 102. Appliances, activities, and/or resources may also be individually tracked or sorted to display the conservation progress of the household 102. In some examples, the central data processing facility 112 provides local, regional, institutional, entity, and/or national progress updates, which, in combination with the individual household's 102 progress, can provide encouragement to continue and/or improve conservation efforts.

Figure 13:
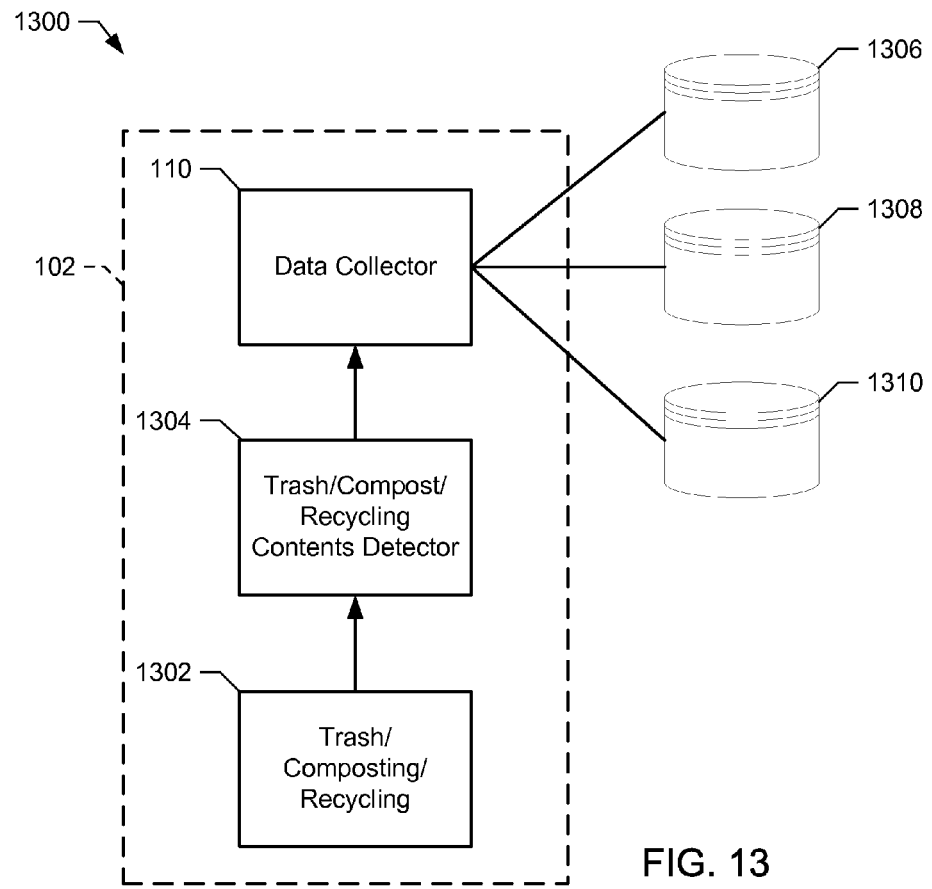
FIG. 13 is a block diagram illustrating an example system to monitor energy consumption due to trash, composting, and/or recycling.

FIG. 13 is a block diagram illustrating an example system 1300 to monitor energy consumption due to trash, composting, and/or recycling. In the example household 102 of FIGS. 1-3, one or more individuals regularly discard used materials into a trash, compost, and/or recycling container 1302. A trash/composting/recycling contents detector 1304 may be included to determine the types of trash, compost, and/or recycling that are discarded. The trash/composting/recycling contents detector 1304 may be implemented using a motion-activated camera and video recognition system and/or a simple weight sensor to determine the weight of the trash, compost, and/or recycling. In other examples, the individual discarding the trash, compost, and/or recycling can report to the data collector 110 the nature and amount of material discarded, as well as the method of disposal (e.g., trash, composting, or recycling). The data collector 110 then accesses a trash database 1306, a composting database 1308, and/or a recycling database 1310 to determine energy consumption data for the discarded item. For example, the energy consumption associated with a piece of trash may include transportation energy costs and local landfill price per unit weight of trash converted to an energy value. A non-biodegradable factor and/or a hazard factor for chemicals can be used to weight the energy consumption associated with trash. Similarly, the energy consumption for recycling may include the energy costs for transportation to the recycling plant, subtracted by the energy saved by recycling. Energy costs for composting may include the cost of transporting the compost material, less the energy saved by composting.

As noted above, the trash/compost/recycling contents detector 1304 may also be used to adjust the cost of disposal based on the nature of the trash contents. This adjustment may be affected by adjusting the energy cost for disposing trash by an amount to offset long term landfill usage (e.g., non-biodegradable plastics), hazardous materials (e.g., paints or household chemicals), etc. These factors may be pre-set based on empirical or other studies and determined by accessing a lookup table or other database using the trash type as the key for performing the lookup. Similarly, the cost to an individual or household for recycling may be modified based on current market values of the materials. A government, agency, or other entity may encourage participation in energy tracking by offering incentives to those who report trash and recycling data and/or to those who keep trash levels below a target (e.g., index 100).

Such incentives would increase the detail of the data available. The data may also be used to price and compare trash and recycling programs between municipalities.

FIGS. 4, 7-9, 11, 14, and 16 are flowcharts representative of example processes that may be executed to implement the example data collector 110, central data processing facility 112, the example barcode scanner 214, the example HRCM device 302, the example central processor 502, the example mobile device 520, the example central data collector 1028, and/or, more generally, the example systems 100 and/or 1000 of FIGS. 1-3, 5, 6, 10 and 13. The example processes of FIGS. 4, 7-9, 11, 14, and 16 may be executed by a processor, a controller, and/or any other suitable processing device. For example, the example processes of FIGS. 4, 7-9, 11, 14, and 16 may be implemented using coded instructions stored on a tangible medium such as a flash memory, or random access memory (RAM) associated with a processor (e.g., the processor 1212 shown in the example processor platform 1200 and discussed below in conjunction with FIG. 12). Alternatively, some or all of the example flowcharts of FIGS. 4, 7-9, 11, 14, and 16 may be implemented using ASICs, programmable logic devices (PLD), field programmable logic devices (FPLD), discrete logic, hardware, firmware, etc. In addition, some or all of the example flowcharts of FIGS. 4, 7-9, 11, 14, and 16 may be implemented manually or as a combination of any of the foregoing techniques, for example, a combination of firmware, software, and/or hardware. Further, although the example processes of FIGS. 4, 7-9, 11, 14, and 16 are described with reference to the flowcharts of FIGS. 4, 7-9, 11, 14, and 16, many other methods of implementing the example data collector 110, barcode scanner 214, HRCM device 302, central processor 502, mobile device 520 or central data collector 1028, and/or, more generally, the example systems 100 and/or 1000 of FIGS. 1-3, 5, 6, 10, and 13 may be employed. For example, the order of execution of the blocks may be changed, and/or some of the blocks described may be changed, eliminated, sub-divided, and/or combined. Additionally, the example processes of FIGS. 4, 7-9, 11, 14, and 16 may be carried out sequentially and/or carried out in parallel by, for example, separate processing threads, processors, devices, circuits, etc.

Figure 4:
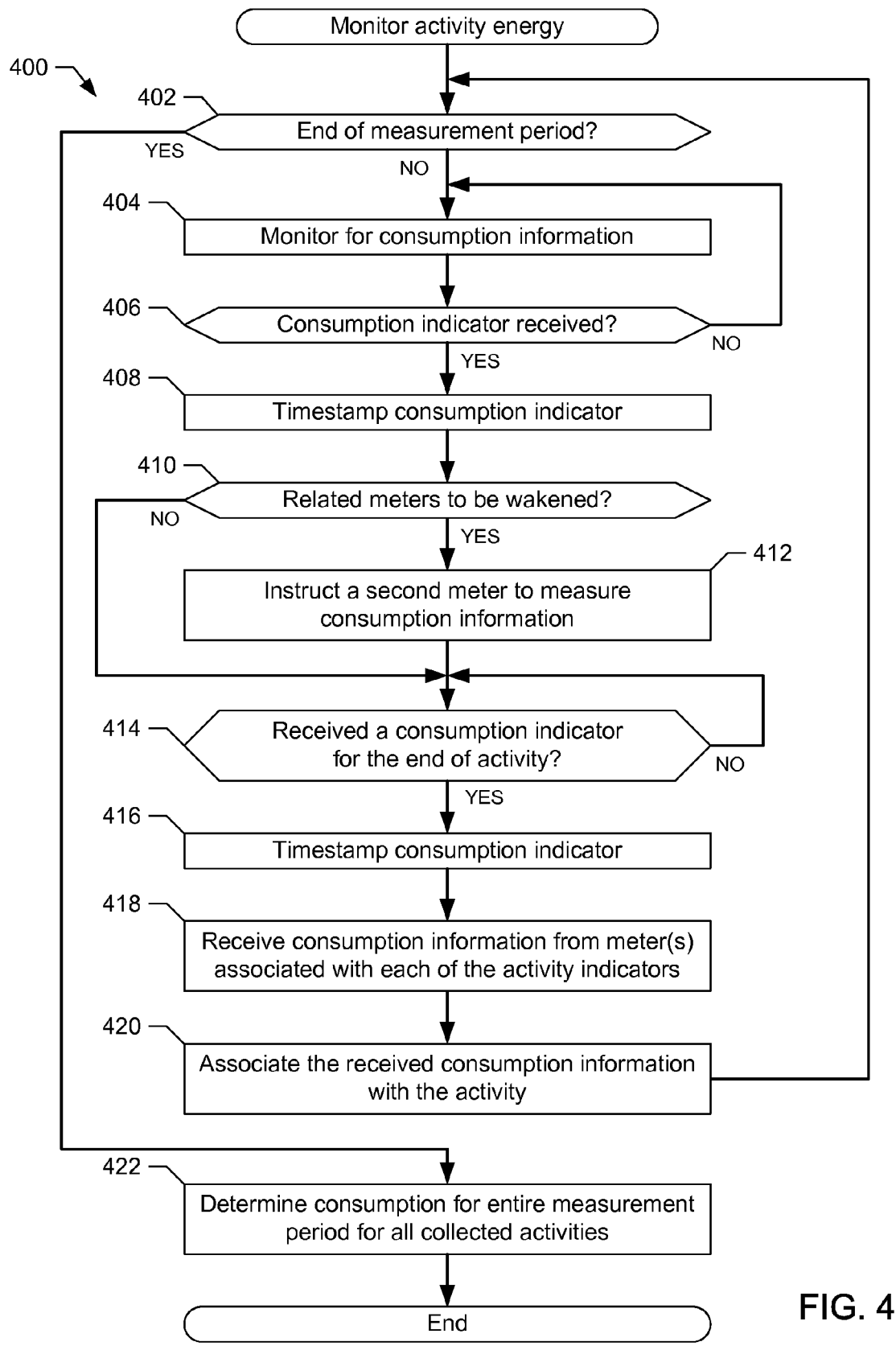
FIG. 4 is a flowchart representative of example machine readable instructions that may be executed to associate an activity with energy consumption.

FIG. 4 is a flowchart representative of example machine readable instructions 400 that may be executed to associate activities with energy consumption. The example instructions 400 may be executed to implement the example HRCM device 302 or the example data collector 110 described in FIG. 3. The HRCM device 302 or the data collector 110 collects energy consumption information for a period of time (e.g., a month). Each monitored period of time may result in different measured energy consumption based on, for example, energy conservation measures, weather, or habits of a measured person or household. Thus, each monitored time period has an associated energy index based on the energy consumed by the measured person or household during the monitored time period. The instructions 400 begins by determining whether the measurement period has ended (block 402).

If the measurement period has not ended (block 402), the HRCM device 302 monitoring for consumption information (e.g., monitoring one or more of the example appliance meters 212*a-n* and/or utility meters 218*a-b* shown in FIG. 3) associated with an appliance (e.g., example the stove/oven 324 shown in FIG. 3) (block 404) and determines whether the meter 212*k* has issued a consumption indicator (block 406). For ease of reference, we will hereinafter refer to the stove/oven 324 as an oven in describing this example.

If no consumption indicator has been issued (block 406), control returns to block 404 to monitor the meter. The example oven 324 typically utilizes a relatively small amount of resources when not actively used. At some time, a person 108 utilizes the oven 324 for a cooking activity, which requires the person 108 to turn on the oven 324 and cause it to consume a larger amount of resources. When the meter 212*k* detects the larger consumption, it issues a consumption indicator to the HRCM device 302. The HRCM device 302 receives the consumption indicator (block 406) and responds by timestamping the consumption indicator to identify the beginning or end of an activity (block 408). The example HRCM device 302 then determines whether additional appliance meters 212*a-n* and/or utility meters 218*a-b* are to be wakened (e.g., from a sleep mode) (block 410). If related meters are to be wakened (block 410), the HRCM device 302 instructs a second meter (e.g., meter 212*e*) to measure consumption information (block 412). For example, the HRCM device 302 may respond to the person 108 turning the oven 324 on by instructing the meter 212*e* coupled to the microwave 312 to measure resources consumed by the microwave 312 while the oven 324 is on.

While the person 108 continues cooking, the HRCM device 302 monitors for a second consumption indicator (e.g., indicative of the person turning the oven off) (block 414). When the second consumption indicator is received (block 414), the HRCM device 302 timestamps the consumption indicator (block 416). The HRCM device 302 receives the consumption information from the meters 212e and 212k (block 418). The meters 212e and 212k may be configured to transmit the measurements to the HRCM device 302 in response to a stop measurement instruction and/or an information request. On receiving the consumption information from the meters 212e and 212k, the HRCM device 302 associates the consumption information with the cooking activity (block 420). Control then returns to block 402 to determine whether the measurement period is over and/or to monitor for additional activities.

If the data collector 110 or the HRCM device 302 determines at block 402 that the measurement period has ended, the HRCM device 302 determines the total energy consumption attributed to each monitored activity (block 422). The total energy consumption for each activity may then be displayed for one or more persons to see and/or analyze.

In addition to the example instructions 400, the HRCM device 302 and/or data collector 110 may continuously or substantially continuously receive resource consumption measurements from the meters 212a-n and 218a-b. Similarly, the meters 212a-n and 218a-b may continuously or substantially continuously measure resource consumption associated with the household appliances, fixtures, and/or devices 304-330 to which the meters 212a-n are coupled.

Energy Index Generation

Figure 10:
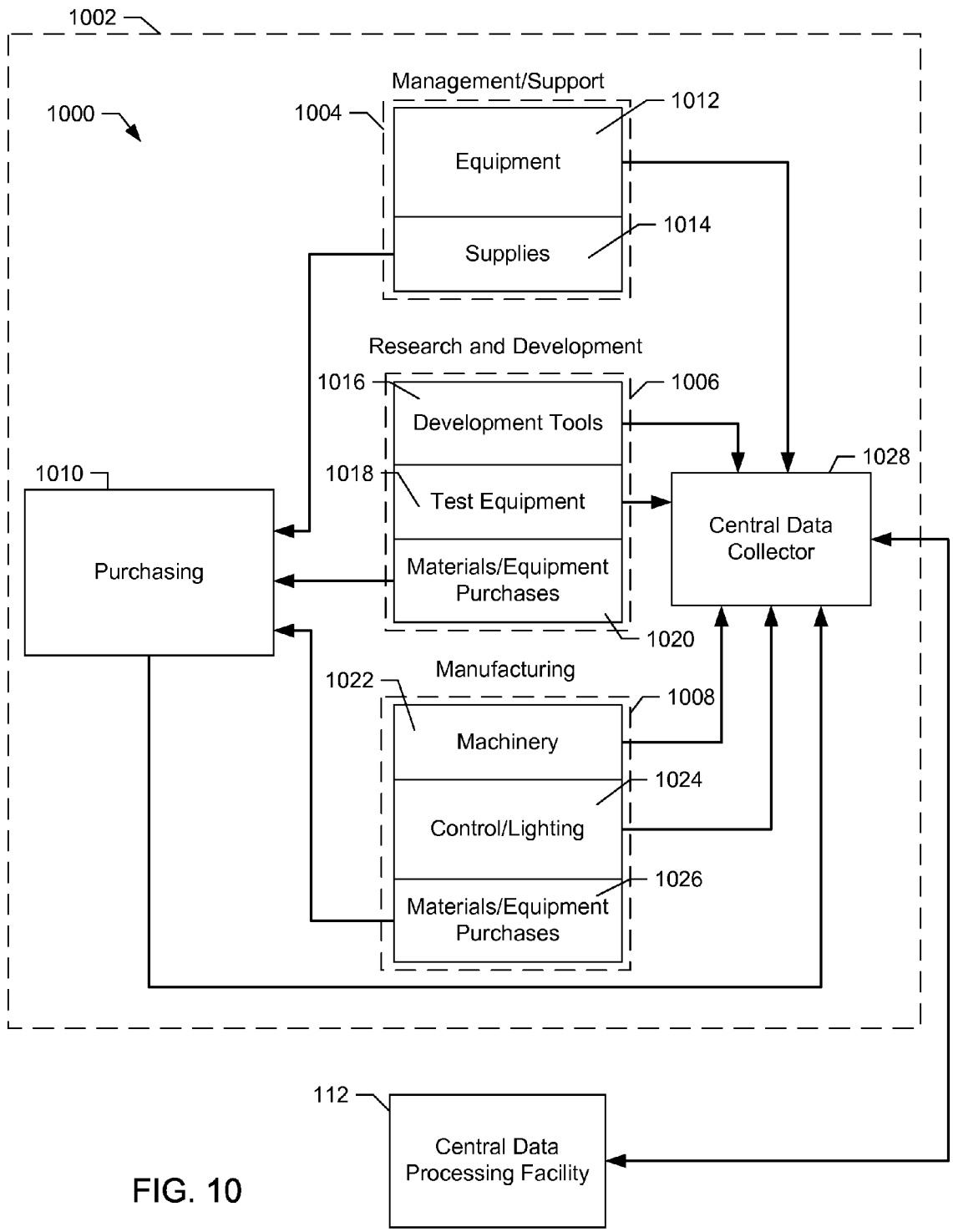
FIG. 10 is a block diagram of an example system to generate an organizational energy consumption index.
Figure 15:
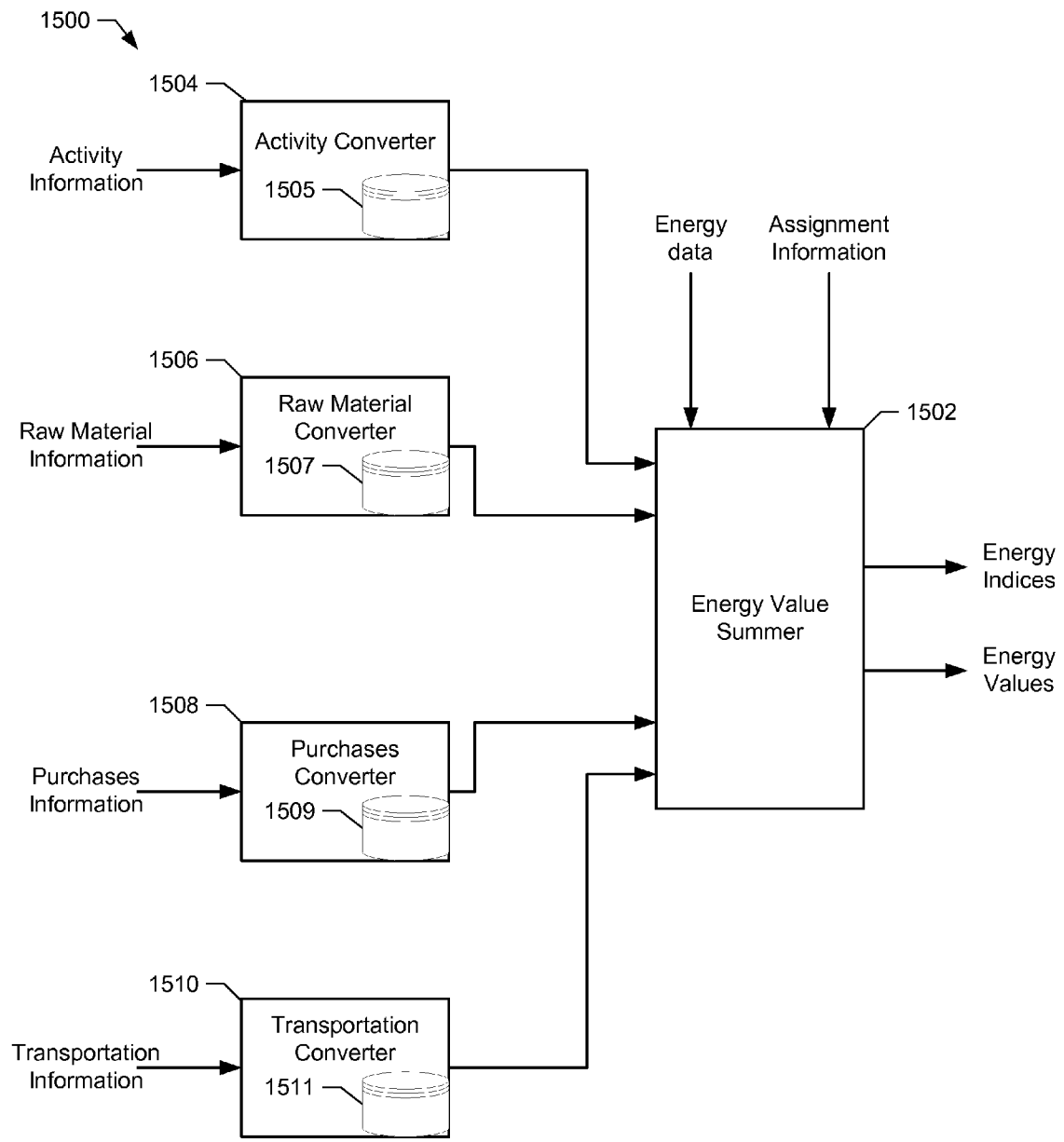
FIG. 15 is a block diagram illustrating an example energy index generator that may be used to implement the example data collector of FIGS. 1 and 2, and/or the example Central Data Collector of FIG. 10.

FIG. 15 is a block diagram illustrating an example energy index generator 1500 that may be used to implement the example data collector 110 of FIGS. 1 and 2, and/or the example Central Data Collector 1028 of FIG. 10. The example energy index generator 1500 receives energy and/or resource consumption information, generates energy values (e.g., home energy values, transportation energy values, out of home energy values, and/or purchase energy values), and one or more energy indices. An energy value summer 1502 receives one or more energy values from several energy converters, as described below, and generates one or more energy indices based on the energy values and/or external energy data.

The illustrated energy index generator 1500 includes an activity converter 1504. The activity converter 1504 receives activity information (e.g., from user input, from energy signature detection, from a mobile device, etc.) and determines the energy values associated with the received activity information. The example activity converter 1504 determines the energy values by querying a database 1505. The activity converter then outputs energy values corresponding to the activities (e.g., out of home energy values, home energy values) to the energy value summer 1502. The example energy index generator 1500 also includes a raw material converter 1506.

The raw material converter 1506 receives raw material information (e.g., from appliance and/or utility meters, from user input, etc.) such as, for example, electricity used, natural gas and/or other natural resources used, trash/compost/recycling, and/or other raw material information. The raw material converter 1506 converts the raw material information to energy values (e.g., home energy values) and sends the energy values to the energy value summer 1502. The example raw material converter 1506 determines the energy values by querying a database 1507.

The example energy index generator 1500 further includes a purchases converter 1508. The example purchases converter 1508 receives purchases information (e.g., by scanning purchase UPCs, from user input, by downloading information from a point-of-sale, etc.). The purchases converter 1508 converts the purchases information to purchase energy values for use by the energy value summer 1502. The example purchases converter 1508 determines the energy values by querying a database 1509. A transportation converter 1510 receives transportation information (e.g., from user input, from a vehicle monitor, etc.). Transportation information may include, for example, fuel used, distance traveled, method of travel, and/or other transportation information. The transportation converter 1510 converts the transportation information to a transportation energy value and sends the value to the energy value summer 1502. The example transportation converter 1510 determines the energy values by querying a database 1511. Any one or more of the example database(s) 1505, 1507, 1509, and 1511 are implemented via one or more of local storage and/or an external database.

The energy value summer 1502 receives the home energy values, the out of home energy values, the purchase energy values, and/or the transportation energy values. The example energy value summer 1502 receives assignment information to assign one or more of the received energy values to one or more different individuals, vehicles, households, organizational units, and/or any other monitored entity. Additionally, the example energy value summer 1502 receives external energy data corresponding to, for example, individual, organizational, household, governmental, agency, and/or any other public and/or private energy data. Such data may include a target energy usage for a particular type of monitored entity. Based on the energy values from the converters 1504-1510 and/or the external energy data, the energy value summer 1502 generates an energy index representative of the energy values.

In some examples, the energy index is a relative figure to illustrate how much energy a monitored entity consumes relative to a similar entity or a desired energy usage goal for that particular entity. In contrast, the example energy values are defined in terms of units of energy. Different monitored entities may have different desired energy usage goals; for example, a monitored individual will have a much different energy usage goal than a monitored multi-national corporation. However, the energy value summer 1502 may provide separate energy indices for an individual and a corporation that are similar or equal, because the energy indices are relative to an appropriate energy value. For example, both the monitored individual and the monitored corporation may have target energy indices equal to '100.' However, the energy value corresponding to the individual's energy index is much smaller than the energy value corresponding to the corporation's energy index.

In another example, an energy index generator 1500 receives activity information, raw material information, purchases information, and transportation information for a country. The activity converter 1504, the raw material converter 1506, the purchases converter 1508, and the transportation converter 1510 convert the respective received information to respective energy values. The example energy value summer then receives the energy values and external energy information. In this example, the external energy information is an energy value determined by governmental or agency policy makers as a national energy usage goal. The energy value summer 1502 sets the energy usage goal as a standard energy index, and determines the current national energy index relative to the standard energy index. In this manner, the example energy index generator 1500 generates easily understandable energy indices for many different types of monitored entities.

The example energy index generator 1500 may be modified to add or subtract converters similar to the converters 1504-1510, which receive resource and/or energy usage information and convert the information to a corresponding energy value in a uniform unit. Additional or alternative converters may include converters to convert business, governmental, agency, manufacturing, not-for-profit, and/or any other type of information concerning energy or resource usage into an energy value.

Figure 16:
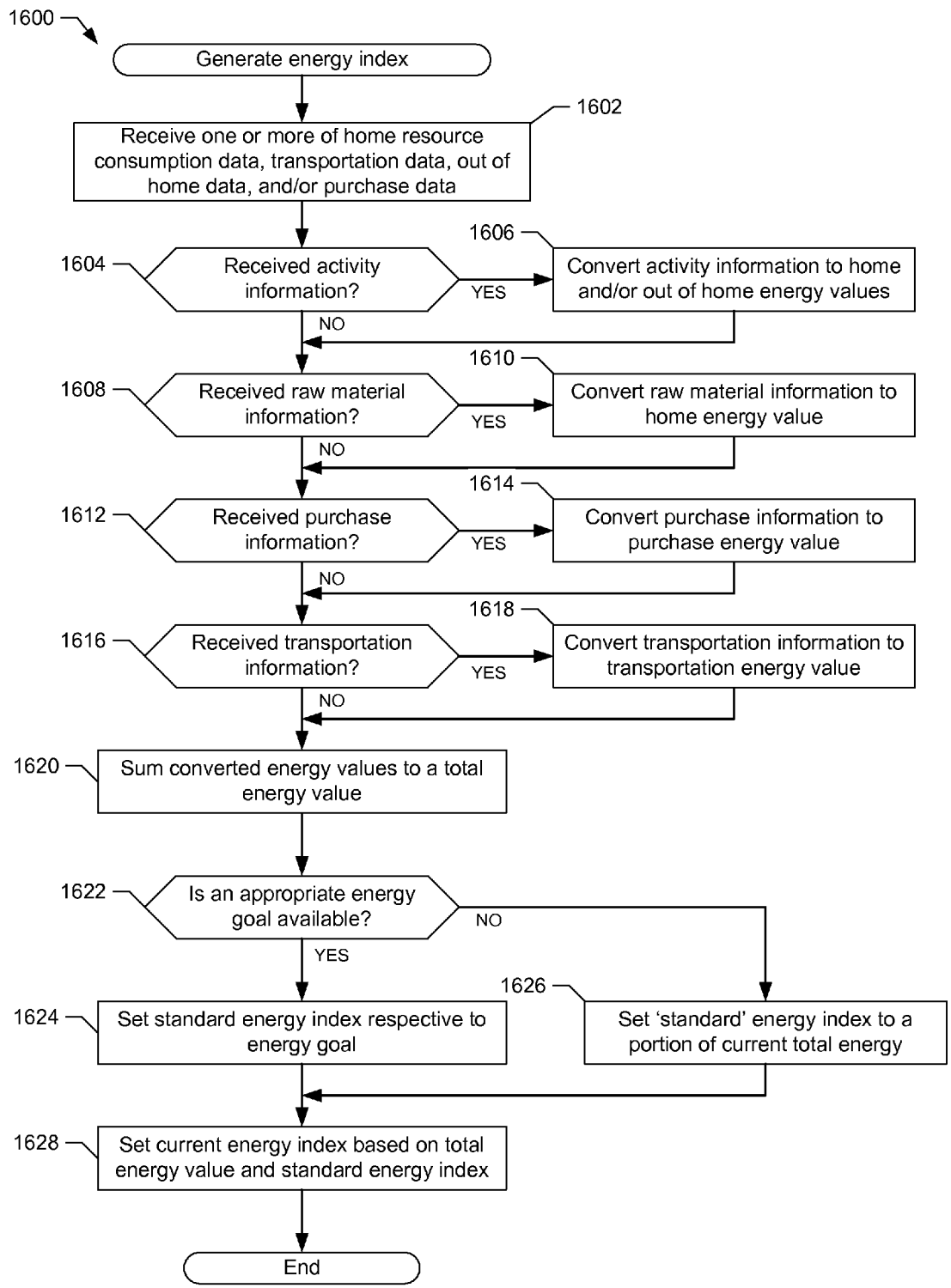
FIG. 16 is a flowchart representative of example machine readable instructions that may be executed to generate an energy index.

FIG. 16 is a flowchart representative of example machine readable instructions 1600 that may be executed to generate an energy index. The example instructions 1600 may be executed to implement the example energy index generator 1500 of FIG. 15. The example instructions 1600 begin by receiving one or more of activity information, raw material information, purchases information, and/or transportation information (block 1602). The example information is received from any one or more of the example barcode scanner 214, HRCM device 302, and/or mobile device 520 of FIGS. 2, 3, and/or 5.

If the energy index generator 1500 has received activity information (block 1604), the example activity converter 1504 converts the activity information to home and/or out of home energy values (block 1606). If the energy index generator 1500 has not received activity information (block 1604), control passes to block 1608. If the energy index generator 1500 has received raw material information (block 1608), the example raw material converter 1506 converts the raw material information to home energy values (block 1610). If the energy index generator 1500 has not received raw material information (block 1608), control passes to block 1612. If the energy index generator 1500 has received purchase information (block 1612), the example purchases converter 1506 converts the purchase information to purchase energy values (block 1614). If the energy index generator 1500 has not received purchase information (block 1612), control passes to block 1616. If the energy index generator 1500 has received transportation information (block 1616), the example transportation converter 1506 converts the transportation information to transportation energy values (block 1618). If the energy index generator 1500 has not received transportation information (block 1616), control passes to block 1620.

When the energy value summer 1502 receives the energy values (blocks 1604-1618), the energy value summer 1502 sums the converted energy values to a total energy value (block 1620). The energy value summer 1502 then determines whether an appropriate energy goal in available (block 1622). The energy goal may be available via, for example, the Internet. If an energy goal is available (block 1622), the energy value summer 1502 sets a standard energy goal respective to the energy goal (block 1624). In some examples, the energy value summer 1502 sets the standard energy goal equal to an energy index of '100.' However, any index may be used to represent the goal.

If an appropriate energy goal is unavailable (block 1624), the example energy value summer sets the standard energy index to a portion of the current total energy (block 1626). As a result, the example energy value summer 1502 generates an energy usage goal based on the current energy usage. In some examples, a user may adjust the energy usage goal. When a standard energy index has been established (block 1622 or 1624), the energy value summer 1502 sets the current energy index based on the total energy value received and relative to the standard energy index. Thus, if the standard energy index is equal to 100, which corresponds to an example energy usage goal of 1000 kilowatt-hours (kWh), then a total energy value of 1100 kWh yields a current energy index of 110. The example instructions 1600 may be repeated on a periodic or aperiodic basis to update the energy usage and/or the energy usage goal, which is reflected in a new current energy index.

Vehicle And Remote Resource Consumption

Figure 5:
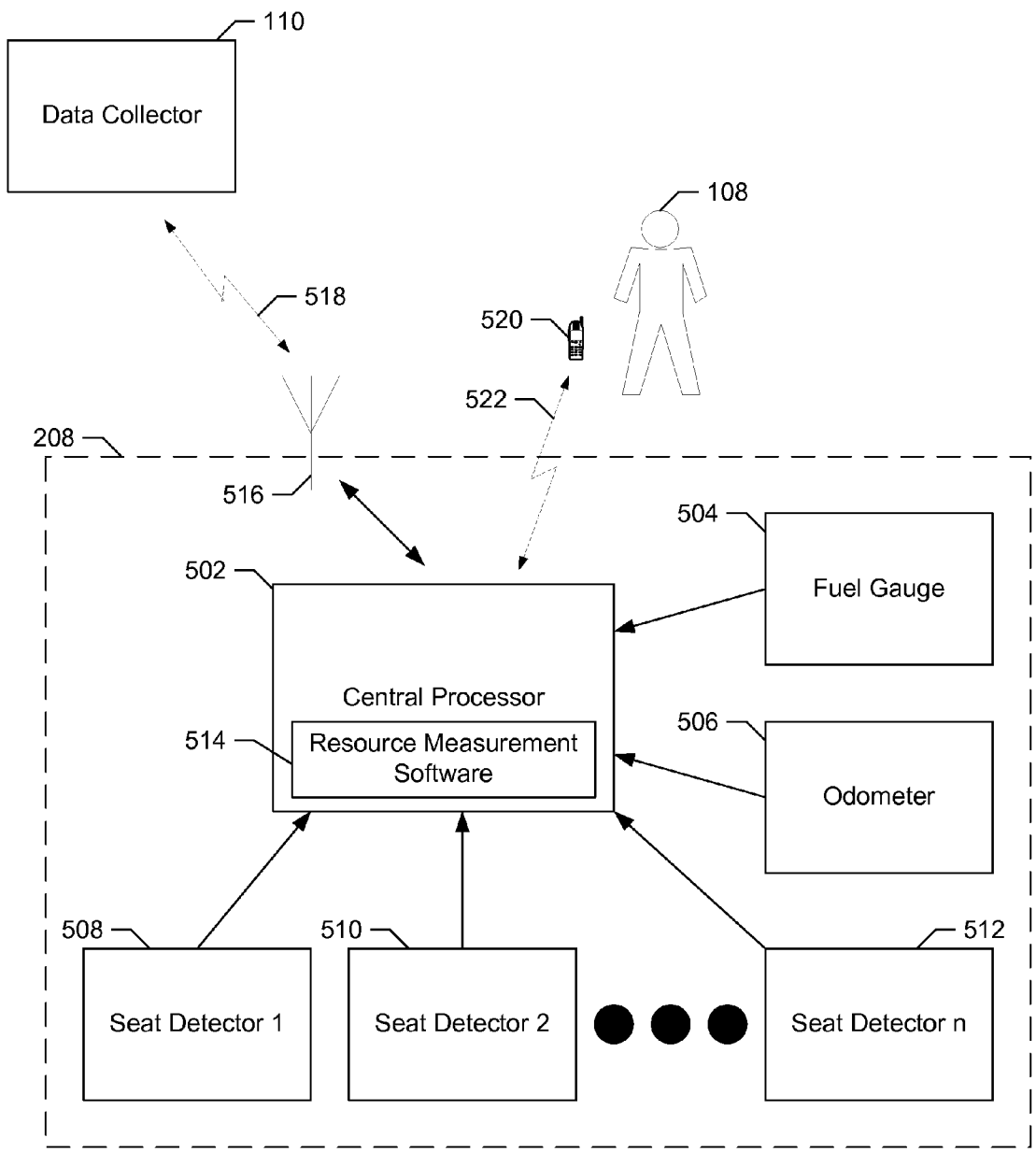
FIG. 5 is a block diagram of an example system to receive resource consumption information from a vehicle associated with a measured person or household.

FIG. 5 is a block diagram of an example system to receive resource consumption information from a vehicle 208 associated with a monitored person or household. The example vehicle 208 is equipped with a central processor 502, which handles many of the vehicle functions. The central processor 502 is provided to the vehicle 208 by the manufacturer. Among other functions, the example central processor 502 receives fuel gauge measurements from a fuel gauge 504, distance measurements from an odometer 506, and seat occupation indications from seat detectors 508-512. The fuel gauge measurements may indicate how much fuel was used in an example trip. The processor 502 may use this fuel consumption information to determine the energy consumed by this trip. The odometer measurements may be used by the processor 502 to determine other resources that were used, such as tire wear, carbon emissions, and/or engine fluid contamination. The odometer measurements may be used in combination with the fuel gauge measurements to determine the efficiency of the example trip and/or of the driver's driving techniques.

Each seat in the example vehicle 208 is equipped with a seat detector 508, 510, 512 to determine whether the seat is occupied. The occupancy information is then used to determine or allocate the resources consumed by each person 108 on the example trip. For example, if one gallon of fuel is used with a driver and no passengers, 1 gallon of fuel is reported as consumed by the driver. However, if one gallon of fuel is used with a driver and three passengers, each passenger and the driver is reported to consume ¼ gallon of fuel.

The example central processor 502 uses resource measurement software 514 to collect and process measurements and indications from the gauges and sensors 504-512 of the vehicle 208. Because such software is not currently included with a vehicle, the software and/or hardware may be installed at a time after the vehicle 208 is constructed and/or sold. The central processor 502 may also be implemented utilizing a separate processing system coupled to the central processing system provided with the vehicle 208. Such a separate processing system may be configured to interface with the central processing system of the vehicle 208 to extract the desired resource consumption measurements from the gauges and sensors 504-512 via the central processing system. A third alternative is to couple a separate processing system directly to the sensors and gauges 504-512 in parallel with the central processing system of the vehicle 208.

To communicate with the data collector 110, the central processor 502 of the illustrated example is coupled to an antenna 516, which allows the central processor 502 to transmit data via a wireless connection 518. Protocols that may be used include WLAN (IEEE 802.11), Bluetooth or any other wireless protocol. Alternatively, the person 108 driving the car may carry a device 520, such as a mobile phone, PDA, or portable storage device (e.g., a USB flash drive), which may be communicatively coupled to the central processor 502 via a wireless or wired connection 522. Data associated with a trip may be downloaded to the device 520, which is then carried into the household 102 by a person 108 and communicatively coupled to the data collector 110 via a wireless or wired connection.

Data may also be collected by manually reporting fuel consumption and mileage of the drivers and passengers of the vehicle 208. For example, the driver (or any person 108) of the vehicle 208 may log the passengers identities and mileage for each trip. When the vehicle 208 is refueled, the driver logs the total fuel and the total mileage. The driver manually inputs the logged information into the data collector 110, which allocates some or all of the consumed fuel to the driver and any passenger(s) according to the fuel consumption and personal mileage for each driver and passenger. Logging may be performed manually (e.g., paper and pencil) or on a device (e.g., the portable device 520). By logging the fuel and mileage information (e.g., transportation energy data) to the device 520, the device 520 may easily transmit the logged information to the data collector 110 with less effort required of the persons 108.

On receiving the transportation energy data from the central processor 502, the data collector 110 processes the data (if processing was not performed by the central processor 502 and/or device 520) and stores the processed data (e.g., transportation energy values) into memory or into a data store.

Additionally or alternatively, the device 520 associated with the person 108 may track the travel of the person 108. Such travel may include riding public transportation, air travel or other travel not associated with a measured vehicle 208. For example, the device 520 may periodically determine geographical coordinates or other location information and log the information in an internal data store to be transmitted to the data collector 110 at a later time. An example device 520 that may be used for this purpose is a Nielsen® NPod™ which is described in U.S. patent application Ser. No. 11/668,931, which is hereby incorporated by reference in its entirety. The device 520 may then process and/or transmit the transportation data for the person 108 to the data collector 110 via a wired or wireless link. The monitored person may manually enter data reflecting usage of non-monitored vehicles (e.g., bus, train, plane, taxi, boat, etc.) by selecting from a pull down menu or typing in data reflecting the vehicle type and distance traveled information.

Purchase-Related Resource Consumption

Figure 6:
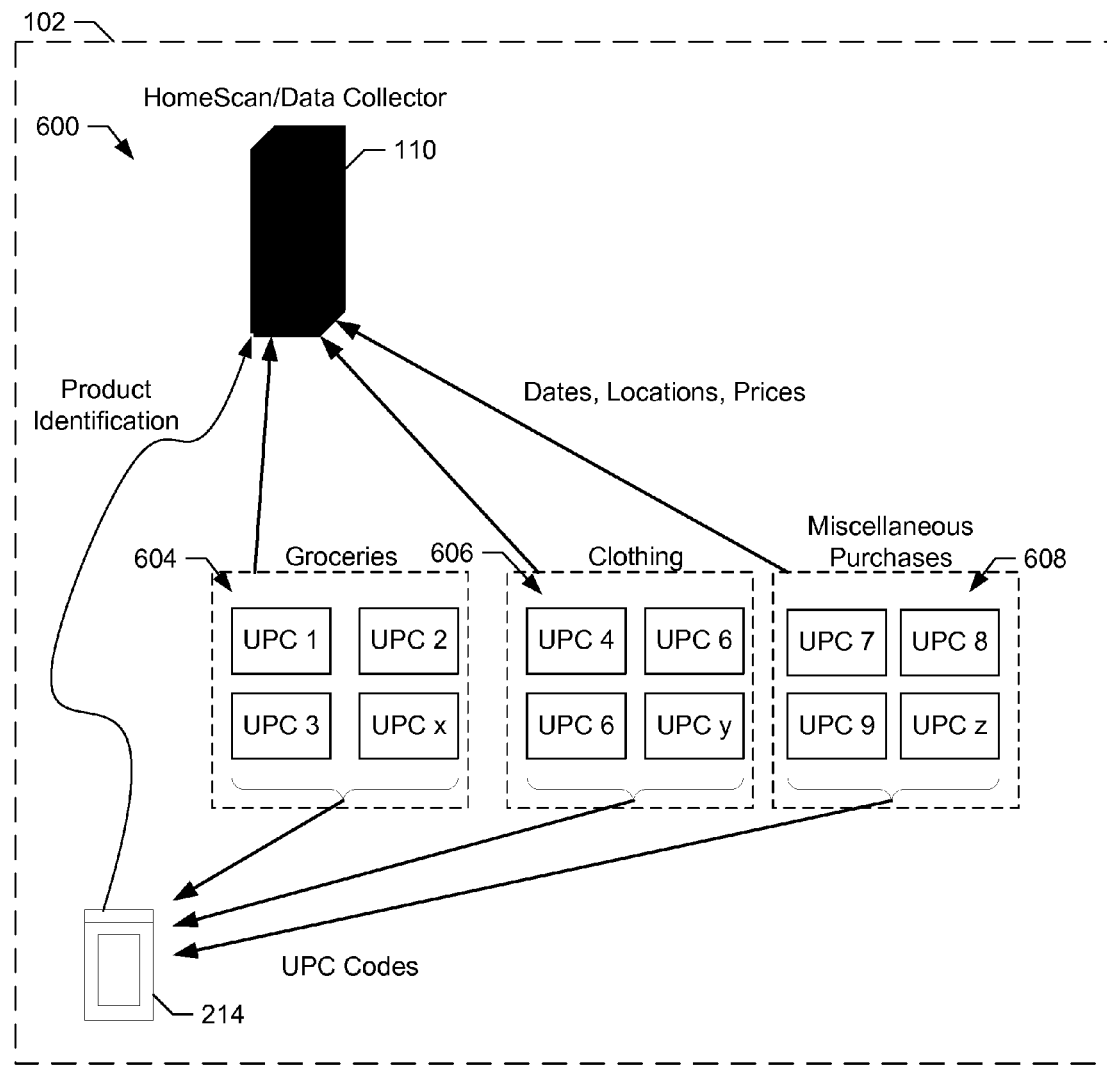
FIG. 6 is a block diagram of an example system to collect resource consumption information associated with purchases made by a measured person or household.

FIG. 6 is a block diagram of an example system 600 to collect resource consumption information associated with purchases made by a monitored person or household. Resource consumption information for purchases is linked to energy consumption by monitored persons or households by determining an energy value for each item purchased. Energy values for a given item may be derived from, among other things, the energy associated with the raw materials for the item, the energy required to produce and/or grow the item, the energy required to package the item, the energy required to transport the item from the producer to the consumer, and/or the energy required to maintain the quality of the item at a store (e.g., refrigeration, etc.).

To demonstrate an example calculation for the purchase energy value of a purchased item, an apple will be considered. To determine the energy for the raw materials and production of the apple, the average amount of fertilizer, water, and fuel (and their corresponding energy values) to grow and gather a harvest of apples is divided by the average number of apples gathered from the harvest. Next, the energy required to sort the apples is divided by the number of apples. The energy value of the packaging material used to package the apples is divided by the apples in a package. Next, the average fuel to transport a truck load of apples (and other items) to a grocery store is divided by the apples (and other items) in the truck load. Finally, the average energy to keep the apples fresh while at the grocery store is divided by the average number of apples in the grocery store. Any further energy values associated with additional processing of the apples may also be taken into account. The sum of the energy values described is used as the purchase energy value for each purchased apple. Other purchased items may have energy values calculated in a similar way or using any other method to determine the approximate energy associated with purchasing that item. For example, some purchased items may have energy values that are based on the energy required to dispose of or recycle them in addition to or as an alternative to the energy values described above.

For ease of discussion, the following description of FIG. 6 will refer to the example household 102 shown in connection with FIG. 1. Within the household 102 is the data collector 110 as described in FIGS. 1-3 and 5. The data collector 110 may integrate with a system such as the Nielsen® HomeScan™ system, which logs purchases for market research. In the example system 600, the data collector 110 is provided with a barcode scanner 214 (e.g., a HomeScan™ scanner) to read machine-readable indicia (e.g., UPC codes) associated with purchases made by the persons 108 associated with the household 102. Purchases may include groceries 604, clothes 606, or any other items or services 608 bought via any commercial arena (e.g., a retail store, via the Internet, etc.). Some purchases, such as grocery produce, do not necessarily have a UPC code or other type of machine-readable indicia. To enter data into the data collector 110 for such items, a user (e.g., a person 108) may use an input device such as a touchscreen, keyboard, or other input device (e.g., the input devices 1124 described in connection with the processing system of FIG. 11).

The example data collector 110 also has a display device (such as one of the display devices 1124 described in connection with the processing system of FIG. 12) to provide output to a user (e.g., a person 108) while the user enters purchase data into the data collector 110. Output may include context-sensitive menus, selection lists, prompts, confirmations, or any other type of output to assist the user in entering data.

An example entry process may occur when a person 108 being measured returns to the household 102 from a shopping trip. While on the example shopping trip, the person 108 makes purchases at a grocery store, a clothing store, and a general merchandise store. When the person 108 returns to the household 102, the person 108 logs the purchases made from each store. In this example, the person 108 logs the purchases from the grocery store first. The person 108 enters the grocery store location (e.g., by selecting from a list and/or entering a store name and/or location) into the data collector 110. Once the location (and date, if necessary) is entered, the person 108 scans the UPC 1 code associated with the first item with the barcode scanner 214 (e.g., the HomeScan™ scanner) to identify the first item. If price data is desired, the data collector may prompt the person 108 to enter the price of the item. If the item is to be attributed to a specific household member, the user is provided the opportunity to identify the same. The person continues scanning UPC codes 604 and entering data in this fashion to identify the purchases made from the grocery store. If a purchased item (e.g., broccoli) does not have a UPC code, the person 108 may enter the item and quantity by doing a keyword search, selecting from a list, or by using other method of data entry.

An alternative method of receiving purchase information is to provide the data collector 110 with an image scanner and optical character recognition software to scan a purchase receipt. The data collector 110 may scan the receipt with the image scanner, and analyze the image with optical character recognition to determine any or all of the data that would otherwise be input by a person 108. A second alternative method for receiving purchase information is to receive a purchase log directly from a store system. For example, the data collector 110 may communicate with a grocery store purchase system via the Internet to download a file for the household purchase(s) in question, which may contain purchased items information, UPC codes, store name, store location, purchase dates, prices, and/or any other information that may be used to determine energy values for the purchased items. Once all the purchased items are logged for the grocery store, the person 108 repeats the logging for the items purchased from the clothing store (e.g., using UPC codes 606) and the general merchandise store (e.g., using UPC codes 608).

When all of the purchases are logged into the data collector 110 or, alternatively, after each purchased item is logged, the data collector 110 performs a query to find the energy associated with each purchased item. The data collector 110 may access a local storage device or data store to retrieve energy values. The data store may store data values for all known items or, alternatively, for frequently-purchased items. If the query does not result in an energy value for the purchased item(s), the data collector 110 may query an outside server via, for example, the Internet. For example, the central data processing server 114 may store the calculated energy values for any or all UPC codes, and/or for items that do not have UPC codes, such as produce. If the outside server does not respond with an energy value, the person 108 may be requested to classify the item via a list, wherein each classification has an approximate energy value per unit quantity. The identity of the purchased item, the purchase energy value associated with the item, and the identity of the person(s) who are to use the purchased item (if applicable) are stored in a memory of the data collector 110.

As an alternative to the data collector 110 querying for purchase energy values and storing the purchased item information with the corresponding purchase energy values, the data collector 110 may instead store a list of purchased items, person(s) for whom the purchases were made, and store(s) where the purchases occurred. The list may then be transmitted to an external server, such as the central data processing server 114, for processing. The external server in this example determines corresponding energy consumption information based on the list. The central data processing server 114 returns the purchase energy values to the data collector 110 for further analysis.

A purchased item may be allocated to one or more persons 108 to associate the energy for the purchased item with the one or more persons 108 consuming the item. This allocation is in contrast to dividing the energy for the purchased item among all members of the household 102 equally. For example, an adult may typically do the purchasing for a household, but certain items, such as baby diapers or formula, are not consumed by the adult. Thus, allocating the purchases of baby diapers and/or formula to the baby, instead of sharing the energy associated with the purchases equally, may generate more accurate personal energy indices for both the adult and the baby.

In addition to purchased goods and services consumed in or near the household 102, the example data collector 110 also logs goods and services purchased and consumed away from the household 102. Example goods and services purchased away include, foods and/or drinks purchased from a restaurant, an automotive care service, a lawn care service, a car rental, and/or any other goods or services the example person 108 may purchase that are not brought into the household 102 for consumption. If the person 108 prefers to log purchases on a later day, the date the purchases were made may be entered as well.

Figure 7:
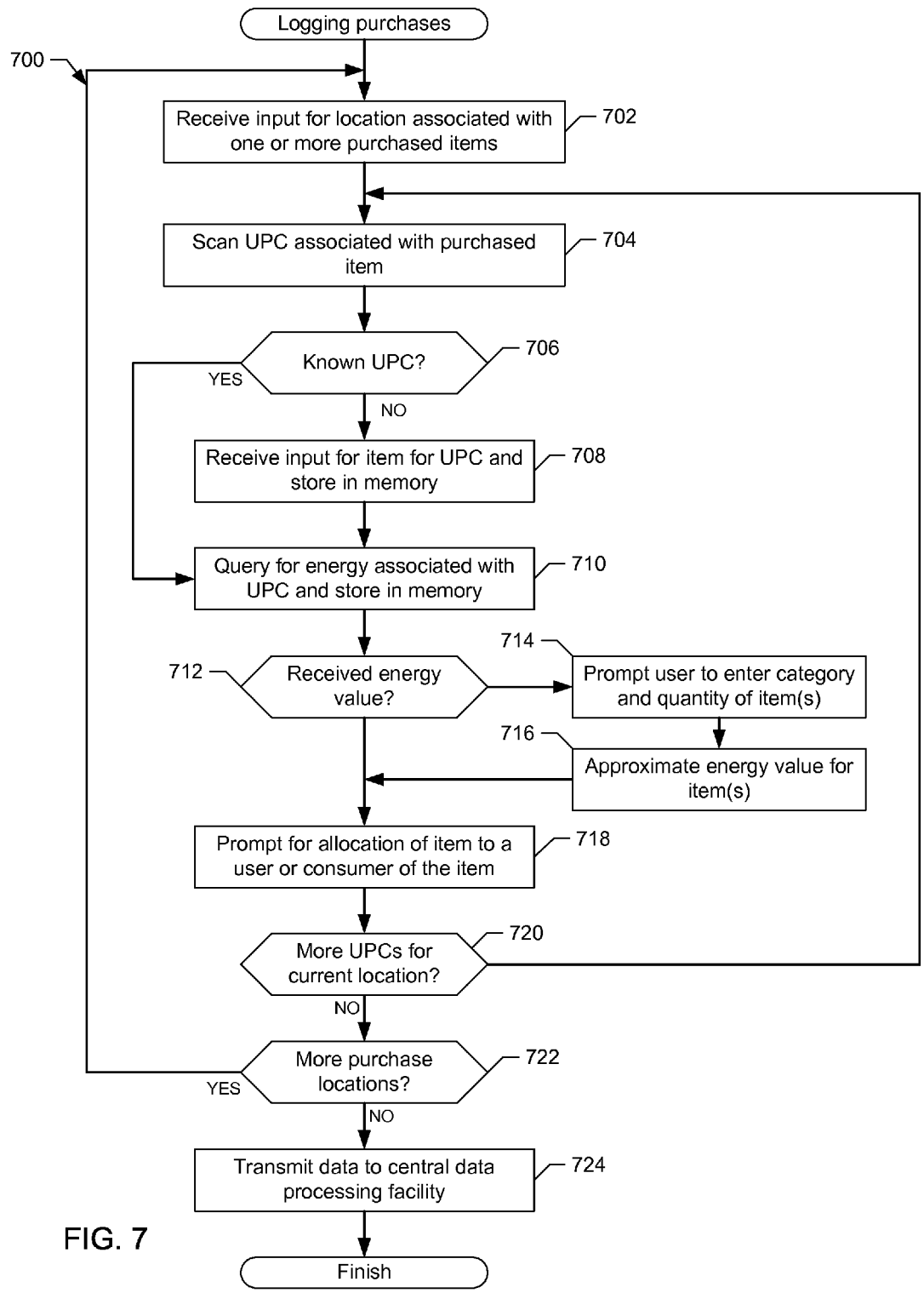
FIG. 7 is a flowchart representative of example machine readable instructions that may be executed to collect data associated with purchases made by a household.

FIG. 7 is a flowchart representative of example machine readable instructions 700 that may be executed to collect data associated with purchases made by a monitored individual or household. The example instructions 700 may be performed by, for example, the data collector 110 of FIGS. 1-3, 5 and 6.

The instructions 700 begin when a person (e.g., the person 108 of FIGS. 1-3, 5 and 6) starts to log purchases. The data collector 110 receives input identifying the location of the point of sale associated with one or more purchased items (block 702). The data collector 110 may also receive purchase date information if, for example, the items are not logged the same day they are purchased. Next, the user 108 scans (e.g., via the barcode scanner 214 of FIGS. 2 and 5) a UPC code for a purchased item and the data collector 110 attempts to recognize the UPC (block 704). If the UPC is not recognized by the data collector 110 (block 706), the data collector 110 may request the person 108 to input the type and quantity of the item, which is stored in memory with the associated UPC code (block 708).

If the UPC is recognized by the data collector 110 (block 706), or after the person 108 inputs the item information (block 708), the data collector 110 performs a query for the energy associated with the item(s) (block 710). The query may search a local data store at the data collector 110 and/or an external server (e.g., the data processing server 114 described in connection with FIG. 1). If a query does not return energy values, the data collector 110 prompts the user to classify and input a quantity of the item(s) (block 714). The data collector 110 then approximates the energy associated with the item based on the classification and quantity.

If the data collector 110 receives an energy value as a result of the query (block 712), or after estimating the energy value (block 716), the data collector 110 requests the person 108 to allocate the item to one or more persons 108 associated with the household to reflect the user(s) or consumer(s) of the item (block 718). For example, if one person 108 of the household is the only one to eat a certain type of food product, purchases of that food product are allocated to that person 108 to reflect the energy consumption by that person 108. The person 108 entering the purchases may allocate the item to one or more persons 108 by, for example, selecting a photo and/or name of the person from a drop down or other list. Purchased items may not be allocated to a household member if the final consumer or user of the item is not known or is not a household member (e.g., a gift). Alternatively, the item may be allocated to the user or consumer after the item is consumed by selecting the item and associating the user or consumer with the item.

When a purchase energy value has been identified (via the query or classification) (blocks 710-716) and allocated to a person (block 718), the data collector 110 prompts the user as to whether there are additional purchases from the current location (block 720). If there are additional purchases, control returns to block 704 to scan another UPC code. If there are no more purchases for the current location (block 720), the data collector prompts the user as to whether there is another point of sale location (block 722). If there is another location where items were purchased, control returns to block 702 to input the next point of sale location. Otherwise, the logging session ends and the data collector 110 transmits the purchase energy data (e.g., the energy values and allocations) to the central data processing site 112 (block 724). The data collector 110 may alternatively wait until all purchases are logged to query for purchase energy values. In this case, any items for which a purchase energy value is not returned may result in an associated prompt for more information from the user.

Alternatively, the instructions 700 may omit the purchase energy value query and, instead, transmit a list of purchased items to an external server (e.g., the central data processing server 114 of FIG. 1). The central data processing server 114 then generates the purchase energy values associated with the purchased items and, if appropriate, sorts them by user or consumer according to the allocation of the purchased items. After generating the purchase energy values corresponding to the purchased items, the central data processing server 114 transmits the example list of purchased items and corresponding purchase energy values to the data collector 110.

Energy Consumption Index

Figure 8A:
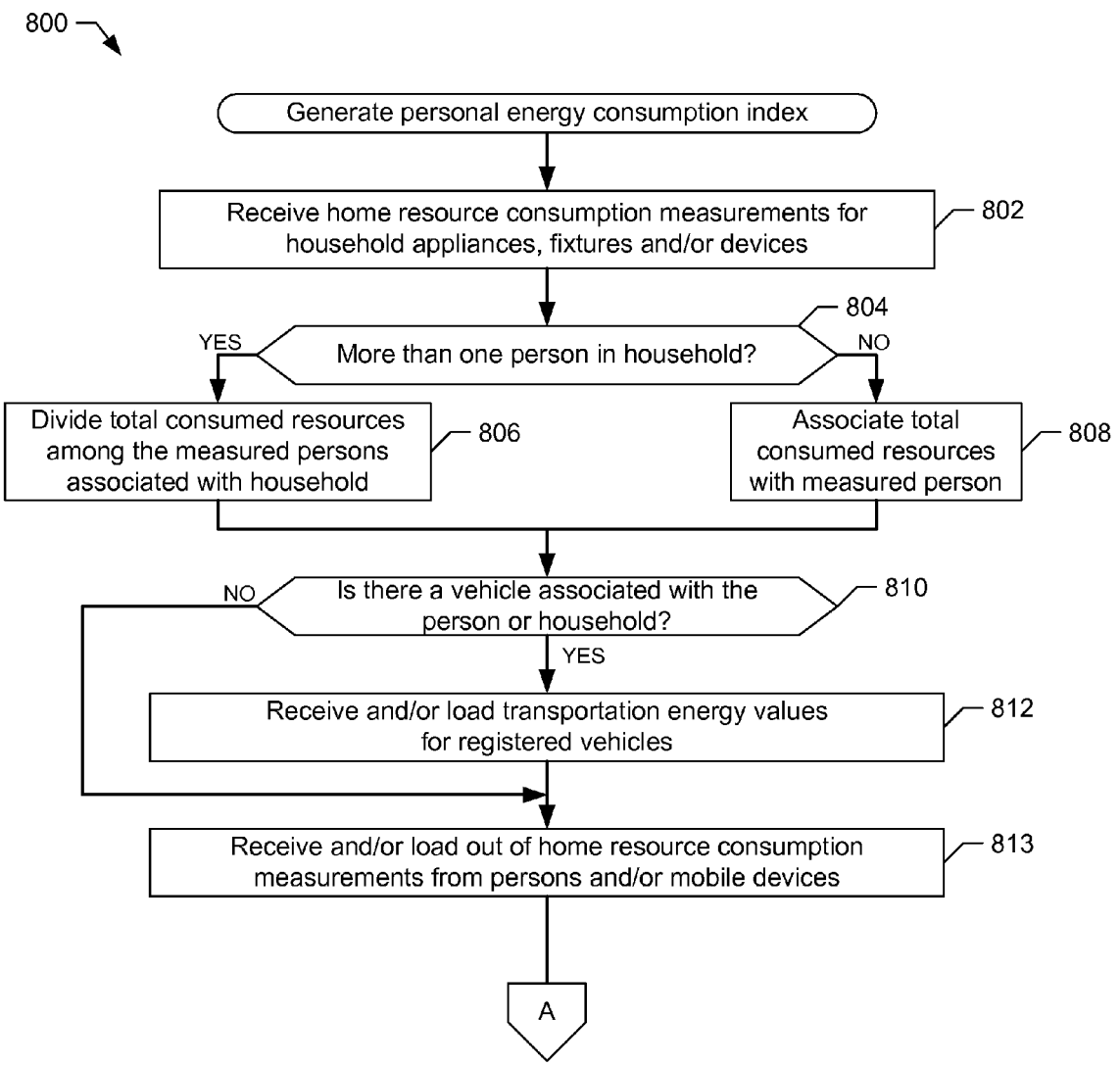
FIG. 8A-8B illustrate a flowchart representative of example machine readable instructions that may be executed to generate a personal energy consumption index for a person.
Figure 8B:
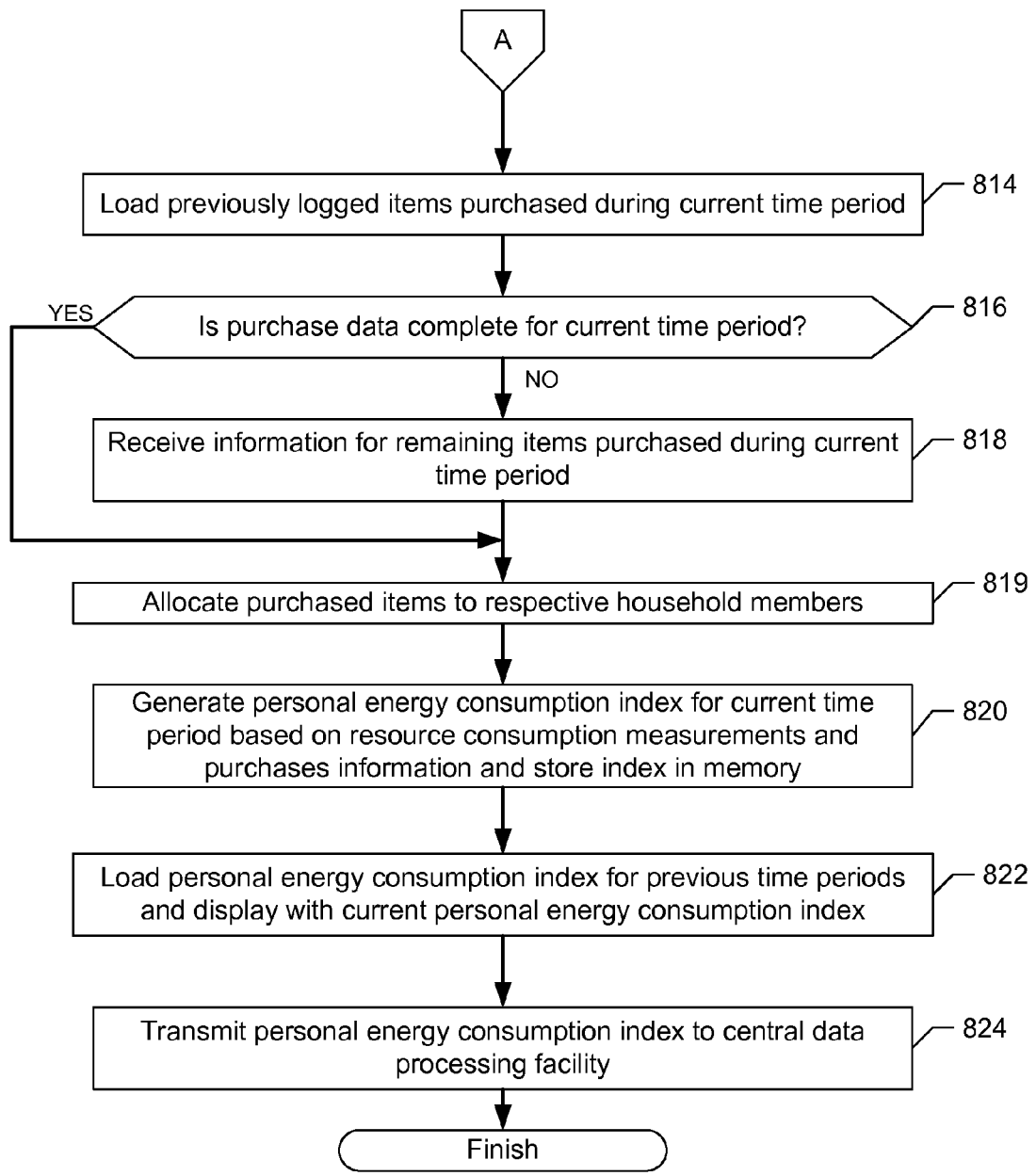

FIGS. 8A and 8B illustrate a flowchart representative of example machine readable instructions 800 that may be executed to generate a personal energy consumption index for a person 108. The example machine readable instructions 800 may be used to implement a function of the data collector 110 described in FIGS. 1-3, 5 and 6. During a particular time period (e.g., a week, a month, etc.), the data collector 110 receives resource consumption data from appliances, fixtures, and/or devices (e.g., via appliance meters 212*a-n* and/or the utility meters 218*a-b* described in FIG. 3) associated with a measured household (e.g., the example household 102 described in FIGS. 1, 2, 5 and 6). Receiving may be done by accepting measurements, requesting data from the appliance meters 212*a-n* and/or the utility meters 218*a-b*, and/or any other method or technique for receiving data (block 802). After the resource consumption measurements for the example month have been received, the data collector allocates them to the persons 108 associated with the household 102. If there is more than one measured person associated with the household 102 (block 804), the resource consumption is divided among the measured persons 108 associated with the household 102 (block 806). Division of the resources may be done equally between each person in the household (e.g., for four persons 108, each person 108 is allocated ¼ of the total resources) or according to another resource allocation scheme (e.g., adults are allocated more per person than children). If there is only one measured person 108 associated with the household 102 (block 804), the data collector 110 associates all of the resource consumption to the measured person 108 (block 808).

The data collector 110 next determines whether there are any vehicles associated with the household 102 (block 810). For example, vehicles may be registered in the data collector 110 during the initial setup of the data collector 110 and/or when persons 108 associated with the household 102 rent, purchase, acquire (borrow, buy, etc.) and/or dispose of vehicles. If there is a vehicle 208 associated with the household 102 or a person 108 (block 810), the data collector 110 loads and/or receives transportation energy values for the vehicle 208 (block 812). The data collector 110 receives and/or loads transportation energy value data for each measured vehicle 208. Additionally or alternatively, the data collector 110 may load or receive additional transportation energy data associated with the person 108. This data may represent travel by the person 108 using, for example, public transportation.

If there are no vehicles associated with the example household 102 or person 108 (block 810) or after the data collector 110 loads and/or receives all the relevant transportation energy value data for the individual (block 812), the data collector 110 receives and/or loads out of home resource consumption measurements (block 813). The out of home consumption measurements may be input via a drop down or other menu, or may be downloaded from the example mobile device 520 described in FIG. 5.

After receiving the out of home information, the data collector 110 loads purchase energy event data (e.g., from a data store) for items logged during the measured month (block 814). When the purchase energy event data is loaded, the data collector 110 determines whether the purchase energy event data for the example month is complete (block 816). This may be accomplished by, for example, prompting a person 108 to enter final purchase data or determining the logging habits of the person 108 relative to the end of the example month. If the purchase energy event data is incomplete (block 816), the data collector 110 receives the remaining purchase energy event data for the time period (block 818). When the purchase data is complete (block 816) or when the complete purchase data is received (block 818), the resources are allocated to the household members (block 819). The resources may be allocated by, for example, equal distribution of the associated purchase energy values among the household members and/or allocating purchase energy values associated with individual items to particular household members.

When the appropriate energy value data has been received, allocated, and loaded into the memory of the data collector 110 (blocks 802-819), the data collector 110 generates a personal energy consumption index for the example month based on the home energy values, the transportation energy values, the out of home values, and the purchase energy values and stores the index in memory (block 820). To generate an example personal energy consumption index, the data collector 110 sums the home energy values, the transportation energy values, the out of home values, and the purchase energy values attributed to the person 108. The personal energy consumption index may then be compared to a standard personal energy consumption index, which may be based on, for example, demographics, location, seasonal weather, and/or other appropriate resource consumption factors. The personal energy consumption index may also be used without comparison to a standard amount, using any desired units such as carbon units or energy.

After the personal energy consumption index is generated, it may then be displayed with personal energy consumption indices for previous time periods for the example person 108 to view changes (block 822). This comparison will allow the person 108, for example, to view how conservation efforts he/she is undertaking are affecting the personal energy consumption index over time. The example data collector 110 also transmits the personal energy consumption index to a central data processing facility (e.g., the central data processing facility 112 and/or data processing server 114 described in FIGS. 1 and 2) for storage and/or for the processing (e.g., grouping with other indices for other monitored users to identify trends, etc.) (block 824). The example central data processing facility 112 uses the personal energy consumption index, which may be associated with demographic information for the person 108, to generate statistical data.

Alternatively, the instructions 800 may omit generating the personal energy consumption index. Instead, the instructions 800 may transmit the home energy values, the transportation energy values, the out of home energy values, and the purchase energy values associated with the household 102, vehicle 208 and purchases to an external location (e.g., the central data processing server 114 of FIG. 1). The central data processing server 114 receives the home energy values, the transportation energy values, the out of home energy values, and the purchase energy values and generates a personal energy consumption index, which may then be transmitted to the data collector 110 for display to the person 108.

Figure 9:
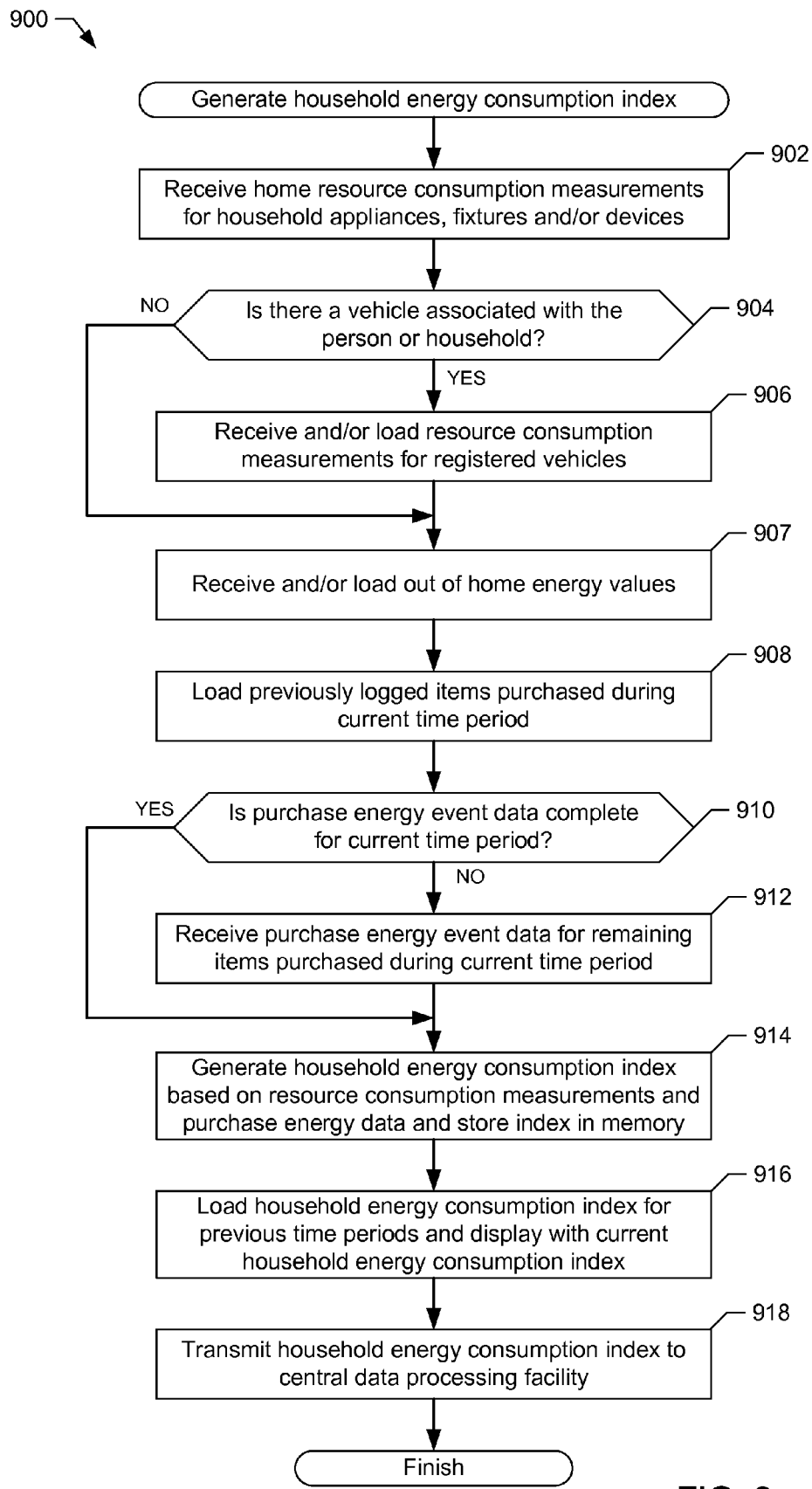
FIG. 9 is a flowchart representative of example machine readable instructions that may be executed to generate a household energy consumption index for a household.

FIG. 9 is a flowchart representative of example machine readable instructions 900 that may be executed to generate a household energy consumption index for a household 102. The household 102 is associated with one or more persons 108, who each may have a personal energy consumption index as described herein. The example instructions 900 is used to implement a function of the data collector 110 described in FIGS. 1-3, 5 and 6. During a particular time period (e.g., a month), the data collector 110 receives resource consumption data (e.g., home energy values, transportation energy values, out of home energy values, and/or purchase energy values) from different sources. For example, home energy values (or data enabling calculation of home energy values) are received from appliances, fixtures (e.g., electrical receptacles), and/or other devices (e.g., via appliance meters 212a-n and/or utility meters 218a-b described in FIG. 3) associated with a measured household (e.g., the example household 102 described in FIGS. 1, 2, 5 and 6). Receiving may be done by accepting measurements from appliance meters 212a-n and/or utility meters 218a-b, requesting data from the appliance meters 212a-n and/or utility meters 218a-b, and/or any other method for receiving data (block 902).

To collect transportation energy values (or data) from a vehicle (e.g., the vehicle 208 described in FIGS. 2 and 5), the data collector 110 first determines whether there are any vehicles associated with the household 102 (block 904). For example, vehicles may be registered in the data collector 110 during the initial setup of the data collector 110 and/or when persons 108 associated with the household 102 acquire or get rid of vehicles. If there is a vehicle 208 associated with the household 102 or a person 108 (block 904), the data collector 110 loads and/or receives all the relevant transportation energy values for the vehicle 208 (block 906). Example methods of communicating data from a vehicle 208 to the data collector 110 may include a wireless communication link (e.g., wireless link 508) or via a mobile unit (e.g., the mobile unit 520) associated with a person 108, which downloads transportation energy data from the vehicle 208 and uploads the data to the data collector 110. The data collector 110 receives and/or loads transportation energy values for each measured vehicle 208. Additionally or alternatively, the data collector 110 may load or receive miscellaneous transportation data associated with measured persons 108 from devices 520 corresponding to those persons. This miscellaneous transportation data may represent transportation by persons 108 using, for example, public transportation.

If there are no vehicles associated with the example household 102 or person 108 (block 904) or when the data collector 110 loads and/or receives transportation energy values for the vehicle (block 906), the data collector receives and/or loads all relevant out of home energy values (block 907) for the individuals associated with the monitored household 102. Out of home energy information is received from, for example, the mobile units 520 carried by household members. The data collector 110 loads purchase energy event data (e.g., from a data store) for items logged during the measured month (block 908). For example, a person 108 may log purchases for each week on a particular day. When the purchase energy event data is loaded, the data collector 110 determines whether the purchase energy event data for the example month is complete (block 910). This may be accomplished by, for example, prompting a person 108 to enter final purchase energy event data or determining the logging habits of the person 108 relative to the end of the example month. If the data collector 110 determines that the purchase energy event data is incomplete (block 910), the data collector 110 receives the remaining purchase energy event data for the time period (block 912). If the data collector determines the purchase energy event data is complete (block 910) or when the complete purchase energy event data is received (block 912), the data collector 110 is prepared to generate the household energy consumption index.

When the appropriate resource consumption data (e.g., home energy values, transportation energy values, out of home energy values, and/or purchase energy values) has been received and loaded into the memory of the data collector 110 (blocks 902-912), the data collector 110 generates a household energy consumption index for the time period of interest (e.g., a period corresponding to the data such as a week, a month, etc.) based on the energy values and stores the index in memory (block 914). The household energy consumption index may be generated using any desired units, such as joules or tons of $CO_2$. The current household energy consumption index may then be displayed with household energy consumption indices for previous time periods for the example household 102 (block 916). This will allow the persons 108 associated with the household 102, for example, to view how conservation efforts being undertaken are affecting the household energy consumption index over time and continue, modify and/or end particular efforts accordingly. The example data collector 110 also transmits the household energy consumption index to a central data processing facility (e.g., the central data processing facility 112 and/or data processing server 114 described in FIGS. 1 and 2) for storage and/or processing (block 918). The central data processing facility 112 uses the household energy consumption index, which may be associated with demographic information for measured persons 108 associated with the household 102, to generate statistical data.

Alternatively, the instructions 900 may omit generating the household energy consumption index. Instead, the process 900 may transmit the household resource consumption data and/or the personal resource consumption data for the persons 108 associated with the household 102, vehicle 208, and purchases to an external location (e.g., the central data processing server 114 of FIG. 1). The central data processing server 114 receives the resource consumption data and generates a household energy consumption index and/or the personal energy consumption indices, which may then be transmitted to the data collector 110 for display to the persons 108 associated with the household 102.

The example processes 800 and 900 are executed at the end of a particular time period such as the example months described. Additionally or alternatively, any or all of the blocks of the example processes 800 and/or 900 may be executed at any time during a time period to gather information or generate intermediate personal or household energy indices for any desired time period.

Organization Energy Consumption Index

FIG. 10 is a block diagram of an example system 1000 to generate an organization energy consumption index. An organization energy consumption index may be generated for any sort of group (e.g., a not-for-profit organization, a church, a school, a government, a governmental agency, a private company, a corporation, an army, etc.) To illustrate the collection of data in support of and generation of an organization energy consumption index, the following will focus on an example company 1002. The example company 1002 has four departments: Management and Support 1004, Research and Development 1006, Manufacturing 1008 and Purchasing 1010. The Management/Support department 1004 has equipment 1012 (e.g., computers, printers, storage equipment) and supplies 1014 (e.g., copy paper, pens, pencils, paper clips). The Research and Development department 1006 includes Development Tools 1016 (e.g., design computers, prototyping machines), Test Equipment 1018 (e.g., scopes, meters), and Materials/Equipment Purchases 1020 (e.g., office supplies, chemicals, circuit components, building materials). The Manufacturing department 1008 includes Machinery 1022 (e.g., manufacturing, packaging, and shipping machines), Control and Lighting 1024 (e.g., operator interface equipment, lights, HVAC), and Materials/Equipment Purchases 1026 (e.g., raw materials, reagents, machinery). The example Purchasing department 1010 has Purchasing systems (e.g., computers and printers) 1027 to, among other things, collect and log purchasing data from the other departments.

Additionally, the example system 1000 includes a Central Data Collector 1028. The Central Data Collector 1028 may be implemented as software executing on a server, as a separate Central Data Collector system coupled to the network of the company, or as some combination of components.

The example company 1002 practices a conventional method of submitting purchase requests to the Purchasing Department 1010, which is responsible for organizing and procuring the requested item(s). As a result, the Central Data Collector 1028 obtains the purchase information from the Purchasing 1010 systems. The purchasing information may be organized by individual, group, department, product line, product, manufacturing line, or by any other criteria depending on the information contained in Purchasing 1010 systems. The Central Data Collector 1028 may passively receive and/or actively request purchasing information from the Purchasing 1010 systems.

After receiving the purchasing information, the Central Data Collector 1028 determines an amount of energy (e.g., an energy value) associated with each purchase. The Central Data Collector 1028 calculates a total purchase energy value from all purchases for the company 1002 and/or allocates purchase energy values to one or more levels or categories within the organization (e.g., individual, group, department, product line, product, and/or manufacturing line).

In addition to receiving purchase information, the example Central Data Collector 1028 receives resource consumption information (e.g., home energy values, transportation energy values, out of home energy values, and/or purchase energy values) from the Management/Support 1004, Research and Development 1006 and Manufacturing 1008 departments. The example resource consumption information collected in the system 1000 includes any of electricity, natural gas, gasoline, fuel oil, kerosene, propane, wood, light, temperature, water, and/or heating oil. Information associated with other types of resources may also be measured and collected. To collect the resource consumption measurements, the example system 1000 implements appliances, utility, vehicle, and/or mobile meters similar to the meters 212*a-n*, 218*a-b*, 504-512 and 520 described in connection with FIGS. 3 and 5. Additionally or alternatively, the example system 1000 may use other types of meters, resource management software, and/or other tools to provide resource consumption information to the Central Data Collector 1028.

After receiving the resource consumption information, the Central Data Collector 1028 converts resource measurements (if not performed by the meter or system providing the measurement) to a standard unit (e.g., energy values which may be reflected in any desired units, such as Joules, kilocalories, tons of $CO_2$, etc.). The energy values are then used to generate an organizational energy consumption index. The organizational energy consumption index may be used to compare energy consumption by the example company 1002 during different time periods or to measure the effectiveness of conservation efforts. Additionally or alternatively, other energy consumption indices may be generated for individual employees, departments, product lines, products, manufacturing lines and/or other organizational units. For example, a Research and Development department energy consumption index may be generated based on purchases originating from the Research and Development 1006 department (e.g., Materials and Equipment purchases 1020) and the measured consumption of resources by the Development Tools 1016 and Test Equipment 1018.

The example Central Data Collector 1028 also transmits generated energy consumption indices and/or other data (e.g., energy values) to a Central Data Processing Facility (e.g., the Central Data Processing Facility 112 described in connection with FIGS. 1 and 2). At the Central Data Processing Facility 122, the generated energy consumption indices, energy values, and/or raw data may be used to track the use of Carbon Units, which are units of emissions traded among companies that allow the companies to emit a certain volume of pollutants per Carbon Unit. The generated energy consumption indices, energy values, and/or raw data may also be used to more accurately and/or more precisely assign energy consumption values (e.g., energy values) to goods and/or services purchased by a household (as described in connection with FIGS. 2 and 6-9). In particular, companies may be expected and/or required by law to label their products with energy values.

The Central Data Collector 1028 may collect purchase information and resource consumption measurements from the departments 1004-1010 using any appropriate method. The manner in which the Central Data Collector 1028 collects information and generates energy consumption indices may depend on, for example, the software systems used by the company 1002. As an example, a small company may not have a purchasing department or use purchasing software and may instead prefer to enter any purchases into the Central Data Collector 1028 manually. This may be done by entering purchase information into a computer terminal, loading payment information from a credit card, scanning and recognizing an invoice, downloading purchase histories from a supply company web site, and/or any combination of the described or other methods. Additionally or alternatively, the bar code scanner approach explained in connection with FIG. 2 could be employed in a business. Resource consumption information may be manually entered using the information contained in a utility bill rather than employing utility meters.

The example Central Data Collector 1028 may also measure resource consumption by activities that are engaged in by the company, such as manufacturing. To measure resource consumption associated with an activity, the Central Data Collector 1028 monitors equipment via resource consumption meters or utility meters for information indicative of a particular activity. When the Central Data Collector 1028 receives an indication that a particular activity is starting, the Central Data Collector 1028 may begin to monitor additional meters to measure the energy consumed by that particular activity. In the illustrated example, the Central Data Collector 1028 associates material or supply usage information with activities. While the activity is performed, the Central Data Collector 1028 monitors the associated equipment until one or more indications are received that the activity has ceased. The measured energy consumption and any materials or supply usage information are then used to determine the energy consumed by the activity (e.g., an energy value). Any other types of information, resources, and/or monitoring techniques may be used to determine the energy consumption (e.g., an energy value) by an activity.

An example activity that may be measured is manufacturing one thousand units of a circuit board. Prior to the start of manufacturing, the Central Data Collector 1028 monitors a number of meters coupled to equipment on an example production line such as a conveyor belt, a soldering oven, a part placement machine, and a packaging machine. To begin the production of the circuit boards, the conveyor belt is turned on. The meter coupled to the conveyor belt signals to the Central Data Collector 1028 that it has been turned on, and the Central Data Collector 1028 begins to further monitor the meters coupled to the soldering oven, the part placement machine, and the packaging machine. As the circuit boards are manufactured, the monitored equipment consumes energy, the amount of which is measured by the meters and transmitted to the Central Data Collector 1028.

When the example manufacturing process is complete, the conveyor belt is turned off and the meter coupled thereto sends an indication to the Central Data Collector 1028 indicating that the activity has ended. The Central Data Collector 1028 then determines the total energy (e.g., energy values) consumed by the equipment, as well as energy associated with the components, solder and packaging for the circuit board. The energy values are totaled to determine the energy (e.g., energy values) to manufacture the one thousand circuit boards. By dividing the total energy value by the quantity, the energy value associated with one circuit board can be calculated.

Although the described example includes manufacturing a fixed quantity of objects, the energy of any activity may be monitored by measuring the energy consumption of the appropriate equipment and/or materials. Further, the Central Data Collector 1028 may transmit the energy consumption information and materials information to an external server (e.g., the central data processing server 114 of FIG. 1) to determine the total consumed energy and/or unit(s) energy (e.g., energy per unit, energy per time).

Many companies and nearly as many business models exist. The example of FIG. 10 is illustrative, and many modifications may be made to adapt the example system 1000 to other business types. Further, individuals who work at home may divide home energy consumption between personal and business consumption using a data collector (e.g., the data collector 110 of FIGS. 1-3).

Figure 11:
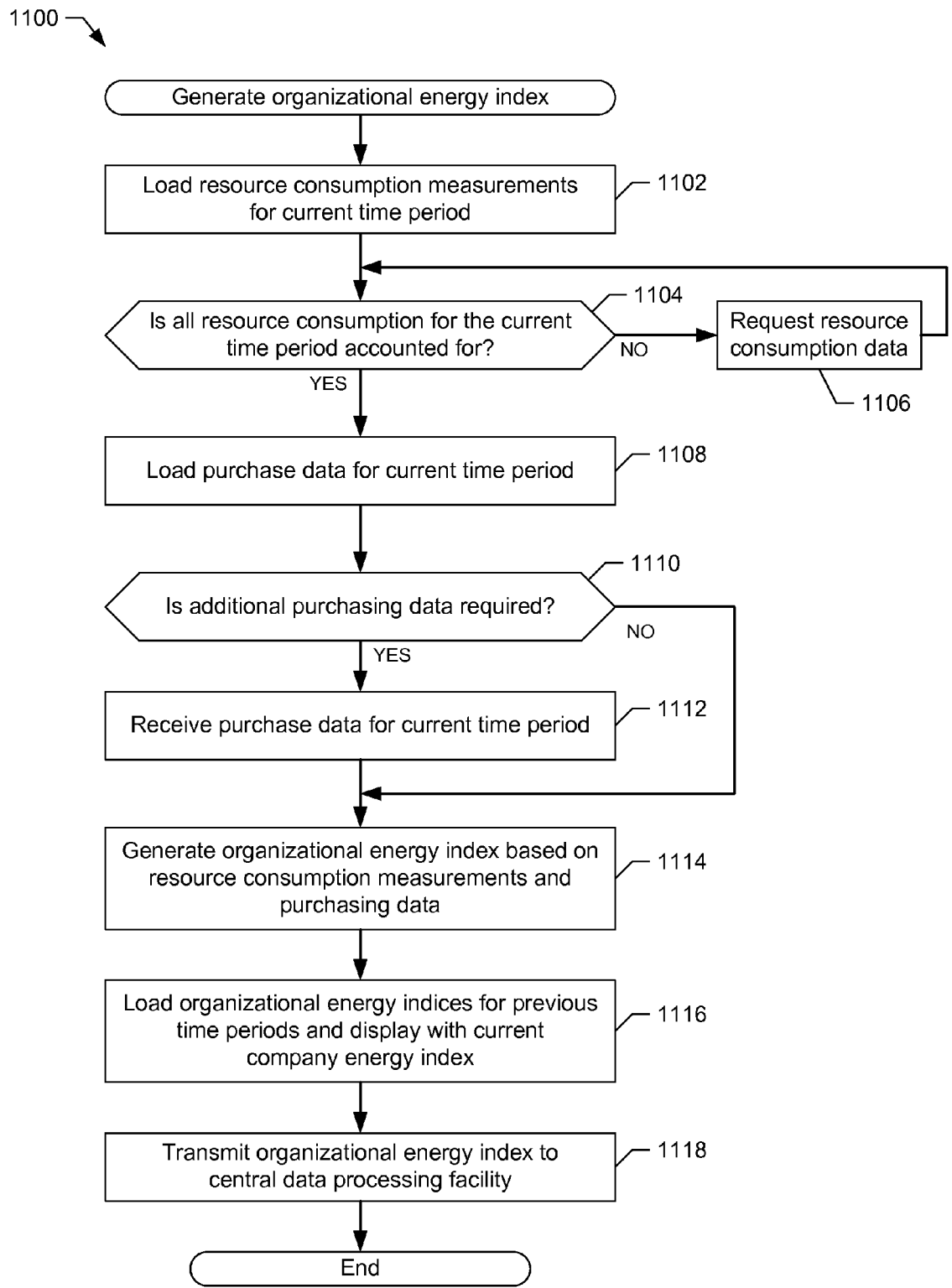
FIG. 11 is a flowchart representative of example machine readable instructions that may be executed to generate an organizational energy consumption index for a company.

FIG. 11 is a flowchart representative of example machine readable instructions 1100 that may be executed to generate an organizational energy consumption index for an organization such as the company 1002. The example process 1100 may be implemented by the example Central Data Collector 1028 described in FIG. 10. The Central Data Collector 1028 loads resource consumption measurements for a current time period (e.g., the current month) from a memory or data store (block 1102). The measurements for the current time period may not include all resources consumed for the current time period, so the Central Data Collector 1028 determines whether the resource consumption information for the current time period is accounted for (block 1104). For example, the Central Data Collector 1028 may query meters and/or other sources (e.g., Equipment 1012, Development Tools 1016, Test Equipment 1018, Machinery 1022 and/or Control/Lighting 1024 described in FIG. 10). If the resource consumption measurements are not complete for the current time period, the Central Data Collector 1028 requests measurements from meters and/or any other sources (block 1106). After requesting and receiving additional resource consumption information, control returns to block 1104.

If the resource consumption measurements are complete for the current time period (block 1104), the Central Data Collector 1028 receives purchasing data corresponding to the query from the purchasing systems 1027 (block 1108). The Central Data Collector 1028 then analyzes the purchasing data from the Purchasing systems 1027 to determine whether additional purchasing data is required (block 1110). For example, purchasing data may be pushed by the purchasing systems 1027 to the Central Data Collector 1028 at regular or irregular intervals. If the purchasing data is not updated when the example time period is over, the Central Data Collector 1028 may require the remaining purchasing data to generate an accurate organizational energy index.

If the example Central Data Collector 1028 determines that further purchasing data is necessary (block 1110), the Central Data Collector 1028 receives additional purchasing data (block 1112). The additional purchasing data may be remaining data for the example current period (i.e., only the data not already received by the Central Data Collector 1028) or may be the complete data or substantially complete purchasing data for the current period, including data already received by the Central Data Collector 1028. The purchasing data may be received by the Central Data Collector 1028 in response to, for example, a request from the Central Data Collector 1028 to the purchasing systems 1027 containing the purchasing data.

If additional purchasing data is not required (block 1110) or after additional purchasing data is received (block 1112), the Central Data Collector 1028 generates an organizational energy index based on the resource consumption measurements and the purchasing data (block 1114). The Central Data Collector may also generate energy indices for one or more individual employees, departments, product lines, products, manufacturing lines and/or other organizational units. When the organizational energy index has been generated, the Central Data Collector 1028 loads additional organizational energy indices from previous time periods and displays the energy indices with the current organizational energy index for analysis (block 1116). Display of the indices may occur on a display, printed medium, or other human- and/or machine-readable means. Additionally or alternatively, the Central Data Collector 1028 transmits the organizational energy index to a central data processing facility (e.g., the example central data processing facility 112 of FIGS. 1 and 2) to be analyzed and compared (block 1118).

Alternatively, the process 1100 may omit generating the organizational energy consumption index. Instead, the process 1100 may transmit the resource consumption data and purchasing data to an external location (e.g., the central data processing server 114 of FIG. 1). The central data processing server 114 receives the resource consumption data and purchasing data and generates an organizational energy consumption index and/or other organizational or employee energy consumption indices, which may then be transmitted to the Central Data Collector 1028 for display.

Figure 14:
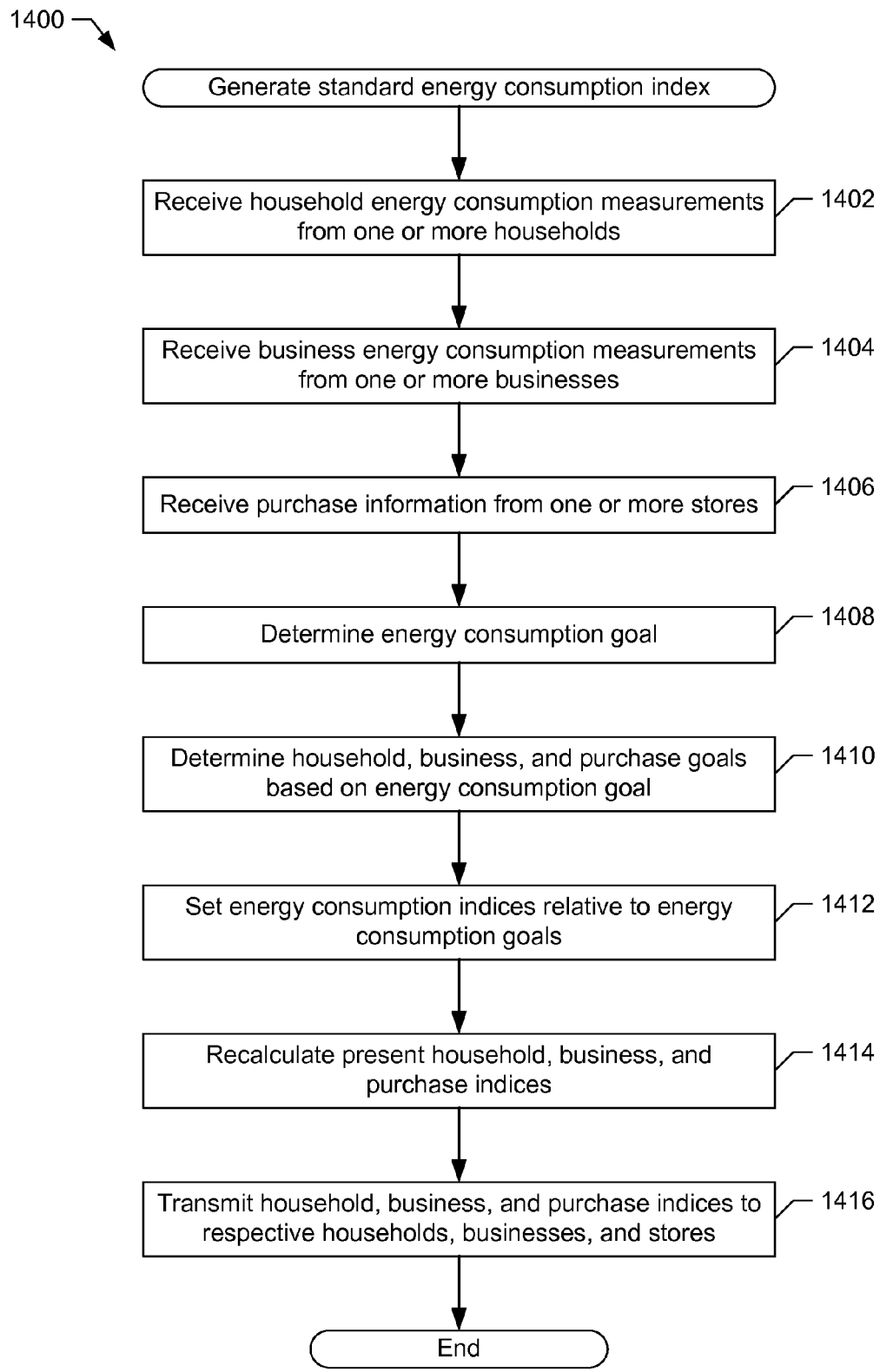
FIG. 14 is a flowchart representative of example machine readable instructions that may be executed to generate energy consumption information.

FIG. 14 is a flowchart representative of example machine readable instructions 1400 that may be executed to generate an energy consumption index. The example instructions 1400 of FIG. 14 are implemented by the example central data processing facility 112 of FIGS. 1-3 and 10. By way of example, assume the government determines that the nation should achieve self-sufficiency with respect to energy usage within 10 years. By comparing the nation's current energy deficit and the current detailed average energy consumption indices (e.g., for household, family, and business), the gap between produced and consumed energy can be understood in terms of the energy consumption indices. The 'target' index for each individual to achieve national energy self-sufficiency is then set to a value (e.g., '100'). Under this example, an individual energy consumption index of '120' indicates that the individual is consuming 20% more energy than the individual energy goal. Similarly, if a family's energy consumption index is '90,' and the family's index goal is 100, the family is using 10% less energy than the goal.

The central data processing facility 112 begins by receiving household energy consumption measurements (e.g., home energy values, transportation energy values, out of home energy values, and/or purchase energy values) (block 1402). The measurements may be provided by one or more data collectors (e.g., the data collectors 110 of FIGS. 1-3) from respective households. The central data processing facility 112 then receives energy consumption measurements (e.g., home energy values, transportation energy values, out of home energy values, and/or purchase energy values) from one or more businesses (block 1404). The measurements may be provided by one or more central data collectors (e.g. the central data collector 1028 of FIG. 10) from respective businesses. The central data processing facility 112 also receives purchase information from one or more stores (e.g., retailers, grocery stores, etc.) (block 1406). The purchase information may supplement or replace any purchase information in the household and business energy consumption measurements.

The central data processing facility 112 then determines an energy consumption goal (block 1408). The goal may be based on, for example, all or a portion of the gross national energy production. The energy usage goal may also be graduated, where the goal gradually decreases to encourage further reductions in energy consumption. Based on the energy consumption goal, the central data processing facility 112 determines individual household, business, and purchase goals (block 1410). The household, business, and purchase goals may be individualized based on individual household or business factors, such as size and/or geographic location.

The central data processing facility 112 then sets one or more energy consumption indices relative to the energy consumption goals (block 1412). Thus, each household or business may have the same (e.g., 100) or different indices that represent an energy consumption goal. The goals are not necessarily equal from household to household or business to business, but goals should be similar for households or businesses with similar traits. Based on the energy consumption goals and energy consumption indices, the central data processing facility 112 calculates the current household, business, and/or purchase indices with respect to their index goals (e.g., 100) (block 1414). For example, if a household is consuming 20% more energy than the household's goal, the household's energy consumption index is 120. The central data processing facility 112 then transmits the energy consumption indices to the respective households and businesses (block 1416). The central data processing facility 112 may also transmit local and national status indicator relative to the goals.

In cases where an individual, family, or business has an energy consumption index greater than their goal, the individual, family, or business should investigate the causes for excess energy consumption. For example, the data collector 110 of FIGS. 2 and 3 receives energy consumption data for the appliances and equipment in a household and 'standard' energy consumption data for the same categories of appliances from the central processing data facility 112. The standard energy consumption data may be based on local data or national data. The data collector 110 then compares the energy consumption data to the standard energy consumption and displays the differences to the individual, family, or business. The data collector may rank the differences for easy identification. With the differences provided by the data collector, the individual, family, or business may make the most effective and cost-efficient improvements to lower their corresponding energy consumption index.

In another example, regulatory agencies may decide to mandate energy consumption index reporting on products and/or equipment. Products such as computers and/or battery chargers may have two energy consumption index ratings: one rating for '24/7' operation, and a second rating that assumes the product is only on for a particular usage period per day (e.g., turned off at night). Two ratings may encourage individuals to recognize the benefits of turning off products when not used. The energy consumption index rating of a product may also be matched to the UPC code of the product. When a consumer shops online for a product or scans a product with a scanner or smartphone, the UPC is used to retrieve the energy consumption index rating. An example shopping device may then retrieve similar products possessing lower energy consumption indices. As a result, consumers can comparison shop by energy consumption indices.

Figure 12:
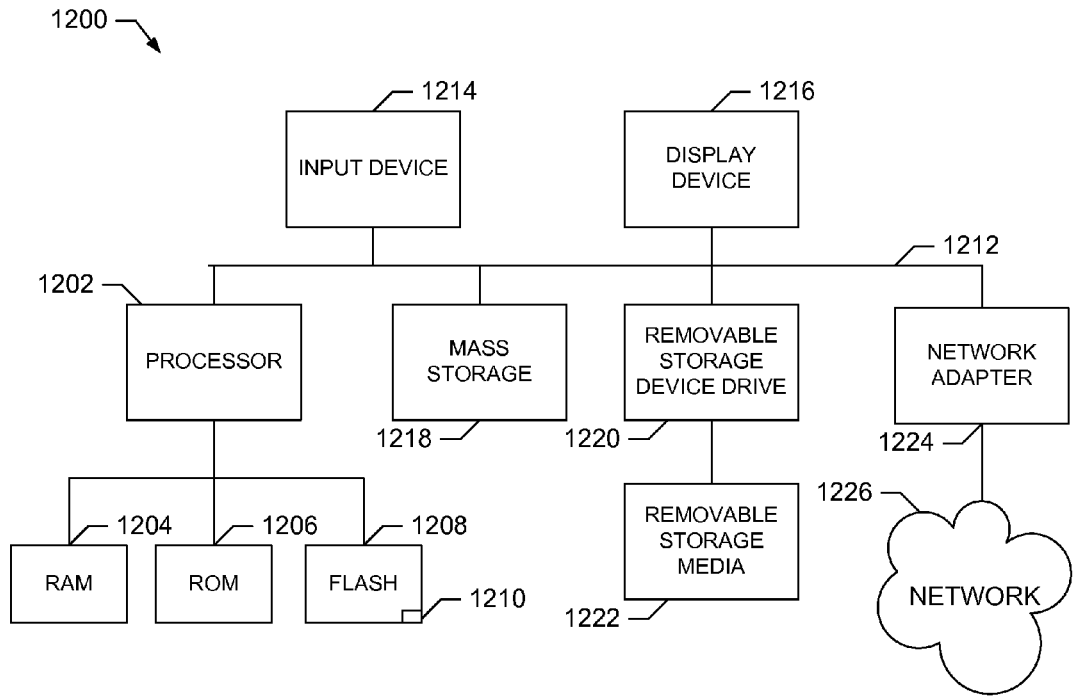
FIG. 12 is a diagram of an example processor system that may be used to implement the example machine readable instructions of FIGS. 4, 7, 8, 9, 11, and/or 14 to implement the example systems, methods, and/or apparatus described herein.

FIG. 12 is a diagram of an example processor system 1210 that may be used to execute the example machine readable instructions described herein, to implement the data collector 110, central data processing facility 112, appliances 202-206, meters 212, barcode scanner 214, mobile devices 216 and 520, HRCM device 302, appliances and devices 304-330, central processor 502, fuel gauge 504, odometer 506, seat detectors 508-512, equipment 1012, supplies 1014, development tools 1016, test equipment 1018, machinery 1022, control/lighting 1024 and/or purchasing systems 1027 of FIGS. 1-3, 5, 6, 10, and 13.

Turning now to FIG. 12, an example processor system 1200 includes a processor 1202 having associated memories, such as a random access memory (RAM) 1204, a read only memory (ROM) 1206 and a flash memory 1208. The flash memory 1208 of the illustrated example includes a boot block 1210. The processor 1202 is coupled to an interface, such as a bus 1212 to which other components may be interfaced. In the illustrated example, the components interfaced to the bus 1212 include an input device 1214, a display device 1216, a mass storage device 1218 and a removable storage device drive 1220. The removable storage device drive 1220 may include associated removable storage media 1222 such as magnetic or optical media.

The example processor system 1200 may be, for example, a conventional desktop personal computer, a notebook computer, a workstation or any other computing device. The processor 1202 may be any type of processing unit, such as a microprocessor from the Intel® Pentium® family of microprocessors, the Intel® Itanium® family of microprocessors, and/or the Intel XScale® family of processors. The memories 1204, 1206 and 1208 that are coupled to the processor 1202 may be any suitable memory devices and may be sized to fit the storage demands of the system 1200. In particular, the flash memory 1208 may be a non-volatile memory that is accessed and erased on a block-by-block basis.

The input device 1214 may be implemented using a keyboard, a mouse, a touch screen, a track pad, a barcode scanner or any other device that enables a user to provide information to the processor 1202.

The display device 1216 may be, for example, a liquid crystal display (LCD) monitor, a cathode ray tube (CRT) monitor or any other suitable device that acts as an interface between the processor 1202 and a user. The display device 1216 as pictured in FIG. 12 includes any additional hardware required to interface a display screen to the processor 1202.

The mass storage device 1218 may be, for example, a conventional hard drive or any other magnetic or optical media that is readable by the processor 1202.

The removable storage device drive 1220 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 1222 is complimentary to the removable storage device drive 1220, inasmuch as the media 1222 is selected to operate with the drive 1220. For example, if the removable storage device drive 1220 is an optical drive, the removable storage media 1222 may be a CD-R disk, a CD-RW disk, a DVD disk or any other suitable optical disk. On the other hand, if the removable storage device drive 1220 is a magnetic media device, the removable storage media 1222 may be, for example, a diskette or any other suitable magnetic storage media.

As described in detail hereinafter, the disclosed system enables the processor 1202 to read information from the removable storage media 1222 placed in the removable storage device drive 1220 in a pre-boot environment. This functionality is imparted to the processor 1202 through a firmware extension that is stored on the removable storage media 1222 at, for example, the time the removable storage media 1222 is formatted. For convenience, the example processor system 1200 of FIG. 12 will be used to describe the format, write, read and boot processes described herein. It will be understood, however, that one or more of these processes may be carried out by different processor systems. For example, a software manufacturer may format an optical disk to include the firmware extension using a first processor to execute the format process and a consumer who purchases the software may use a second processor to execute the read process on his/her system to install the software.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to generate an energy consumption index, the method comprising:
    measuring, via a first sensor, resources consumed at a home associated with a person and calculating a home energy value indicative of the resources consumed at the home;
    measuring, via a second sensor, resources consumed by the person while located outside the home and calculating an out of home energy value indicative of the resources consumed by the person while located outside the home;
    identifying goods purchased by the person and calculating a purchase energy value indicative of an amount of energy required to manufacture the goods and to manufacture packaging of the goods; and
    generating, via a logic circuit, an energy consumption index associated with the person based on the home energy value, the out of home energy value, and the purchase energy value.

2. A method as defined in claim 1, further comprising allocating at least a portion of the home energy value, a portion of the out of home energy value, or a portion of the purchase energy value from the person to a second person.

3. A method as defined in claim 1, further comprising displaying the personal energy consumption index at a location visible to the person.

4. A method as defined in claim 1, further comprising measuring resources consumed by the person associated with a vehicle and calculating a transportation energy value indicative of the resources consumed by the vehicle.

5. A method as defined in claim 1, wherein the resources consumed at the home comprise at least one of electricity measurements, natural gas measurements, gasoline measurements, fuel oil measurements, kerosene measurements, propane measurements, wood measurements, light measurements, temperature measurements, water measurements, and/or heating oil measurements.

6. A method as defined in claim 1, further comprising transmitting the energy consumption index to an external server for aggregating with an additional energy consumption index.

7. A method as defined in claim 6, further comprising displaying the energy consumption index and the aggregated energy consumption indices at a location visible to the person.

8. An apparatus to generate an energy consumption index, comprising:
    an activity converter to convert activity information associated with activities performed by one or more household members to at least one of a home energy value or an out of home energy value;
    a raw material converter to convert raw material information associated with raw material usage to a second home energy value;
    a purchases converter to convert purchases information associated with purchased goods to a purchase energy value indicative of an amount of energy required to manufacture the goods and to manufacture packaging of the goods;
    a transportation converter to convert transportation information associated with transporting one or more household members to a transportation energy value; and
    a logic circuit to compute an energy index based on one or more of the first home energy value, the out of home energy value, the second home energy value, the purchase energy value, and the transportation energy value.

9. An apparatus as defined in claim 8, wherein the energy value summer further receives data associated with an energy usage goal, and wherein the energy index is further based on the energy usage goal.

10. An apparatus as defined in claim 8, wherein the energy value summer sums the received energy values, and outputs at least one of the energy index or the summed energy values to an external data processor.

11. An apparatus as defined in claim 8, wherein the raw material information comprises at least one of electricity measurements, natural gas measurements, gasoline measurements, fuel oil measurements, kerosene measurements, propane measurements, wood measurements, light measurements, temperature measurements, water measurements, or heating oil measurements.

12. A tangible article of manufacture, storing machine readable instructions which, when executed, cause a machine to at least:
    measure resources consumed at a home associated with a person and calculate a home energy value indicative of the resources consumed at the home;
    measure resources consumed by the person while located outside the home and calculate an out of home energy value indicative of the resources consumed by the person while located outside the home;

identify goods purchased by the person and calculate a purchase energy value indicative of an amount of energy required to manufacture the goods and to manufacture packaging of the goods; and generate an energy consumption index associated with the person based on the home energy value, the out of home energy value, and the purchase energy value.

13. An article of manufacture as defined in claim 12, wherein the instructions further cause the machine to allocate at least a portion of the home energy value, the out of home energy value, or the purchase energy value from the person to a second person.

14. An article of manufacture as defined in claim 12, wherein the instructions further cause the machine to display the energy consumption index at a location visible to the person.

15. An article of manufacture as defined in claim 12, wherein the instructions further cause the machine to measure resources consumed by a vehicle and to calculate a transportation energy value indicative of the resources consumed by the vehicle.

16. An article of manufacture as defined in claim 12, wherein the resources consumed at the home comprise at least one of electricity measurements, natural gas measurements, gasoline measurements, fuel oil measurements, kerosene measurements, propane measurements, wood measurements, light measurements, temperature measurements, water measurements, and/or heating oil measurements.

17. An article of manufacture as defined in claim 12, wherein the instructions further cause the machine to transmit the energy consumption index to an external server for aggregating with an additional energy consumption index.

18. A method to generate energy consumption data, comprising:

querying a database for a purchases energy value associated with an item purchased by an individual;

querying the database or a second database for an out of home energy value associated with activity information corresponding to the individual for an out of home, non-transportation activity;

combining, via a logic circuit, the purchases energy value and the out of home energy value;

assigning a combined energy value to a purchasing household or a purchasing individual; and outputting an indicator representing energy consumption of the household or the individual.

19. A method as defined in claim 18, further comprising:

querying the database, the second database, or a second database for a transportation energy value associated with the transportation information associated with the individual, wherein the indicator representing the energy consumption of the household or the individual is based on the purchases energy value, the out of home energy value, and the transportation energy value.

* * * * *